United States Patent [19]

Inoue

[11] Patent Number: 4,689,467
[45] Date of Patent: Aug. 25, 1987

[54] LASER MACHINING APPARATUS
[75] Inventor: Kiyoshi Inoue, Tokyo, Japan
[73] Assignee: Inoue-Japax Research Incorporated, Yokohama, Japan
[21] Appl. No.: 641,979
[22] PCT Filed: Dec. 17, 1983
[86] PCT No.: PCT/JP83/00441
§ 371 Date: Aug. 17, 1984
§ 102(e) Date: Aug. 17, 1984
[87] PCT Pub. No.: WO84/02296
PCT Pub. Date: Jun. 21, 1984

[30] Foreign Application Priority Data

Dec. 17, 1982 [JP] Japan .............................. 57-220092
Jan. 14, 1983 [JP] Japan .............................. 58-003367
Apr. 13, 1983 [JP] Japan .............................. 58-063793

[51] Int. Cl.⁴ .............................................. B23K 26/00
[52] U.S. Cl. ........................... 219/121 L; 219/121 LS; 219/121 FS; 219/121 LY
[58] Field of Search ..... 219/121 L, 121 LM, 121 LZ, 219/121 LS, 121 LY, 121 EM, 121 EY, 121 PM, 121 LT, 121 FS

[56] References Cited

U.S. PATENT DOCUMENTS

| | | | |
|---|---|---|---|
| 3,604,890 | 10/1969 | Mullaney et al. | 219/121 LT |
| 3,622,740 | 11/1971 | Ravussin | 219/121 LT |
| 3,935,419 | 1/1976 | Lambert et al. | 219/121 LS |
| 4,332,999 | 6/1982 | Wittke | 219/121 FS |
| 4,365,136 | 12/1982 | Gottlieb | 219/121 LS |
| 4,390,774 | 6/1983 | Steen et al. | 219/121 FS |
| 4,459,986 | 7/1984 | Karaki | 219/121 LZ |
| 4,520,816 | 6/1985 | Schackar et al. | 219/121 LS |
| 4,533,400 | 8/1985 | Benedict | 219/121 LT |

FOREIGN PATENT DOCUMENTS

| | | | |
|---|---|---|---|
| 0137059 | 11/1978 | Japan | 219/121 FS |
| 0144890 | 11/1981 | Japan | 219/121 FS |

Primary Examiner—M. H. Paschall
Attorney, Agent, or Firm—Roberts Spiecens & Cohen

[57] ABSTRACT

This invention relates to improvement in a laser machining apparatus using both a working laser generator (101) and an auxiliary energy supplying apparatus (110) such as a plasma or the like. A feature of the invention is that an auxiliary energy generated from the auxiliary energy supplying apparatus is radiated on a workpiece (118) to a location which is slightly apart from an irradiation point of a working laser beam. In a preferred embodiment, the auxiliary energy supplying apparatus (110) is attached to a rotary disk (113) thereby allowing the auxiliary energy to be radiated to a location which is always preceding an irradiation point of the laser beam in the working progressing direction. The auxiliary energy may be radiated onto a surface opposite to the surface of a workpiece to which the laser beam is radiated. With such an arrangement, working efficiency and accuracy are improved and a structure of the whole system is also simplified, resulting in less failure. To further improve the working efficiency, in a desirable embodiment, an abrasive grain may be supplied to the working portion, or a high-pressure working fluid may be jetted thereto, or a working fluid to which an ultrasonic vibrational energy was applied may be supplied thereto. Further, a focal point automatic adjusting mechanism of the laser beam may be provided.

19 Claims, 13 Drawing Figures

LASER MACHINING APPARATUS

FIELD OF THE INVENTION

The present invention relates to a laser machining apparatus and, more particularly, to improvements in a laser machining apparatus which works by applying both a laser beam as a main energy source for the working operation and an auxiliary energy source of plasma or the like.

BACKGROUND OF THE INVENTION

A laser machining apparatus in which a laser beam is focused by a focusing lens and performs the working operation while radiating the laser beam onto a workpiece is publicly known and is widely utilized. Further, a laser machining apparatus which works using both the laser beam and another auxiliary energy source such as a plasma jet or the like and thereby improving the working efficiency has been developed and is being used.

In the above-mentioned laser machining apparatus, although the working efficiency and working speed were remarkably improved as compared with conventional laser machining apparatus, the working efficiency and speed are still low and, particularly, in the case of cutting and working a thick workpiece or the like, it takes a long time and a high degree of working accuracy cannot be obtained.

Such a conventional laser machining apparatus using an auxiliary energy source performs the working by collecting the laser and the auxiliary energy onto the same irradiation point on a workpiece. When giving a relative movement between the workpiece and the irradiation point of the working laser beam and thereby performing the cutting work or welding work, etc., there is the problem that the heating by the auxiliary energy is not effectively utilized to the best advantage for the working by the laser beam.

In addition, in the case of working by collecting the working laser beam and the auxiliary energy onto the same irradiation point on a workpiece, the lens system for focusing the laser beam and the means for generating the auxiliary energy overlap at a certain portion, such that the arrangement of the apparatus becomes complicated and also its operation becomes troublesome.

On the other hand, although the auxiliary energy is provided to mainly heat a workpiece to a constant temperature and thereby to assist the working by the laser beam, since a portion of constant extent is heated by the irradiation of the auxiliary energy, in the case where the workpiece is relatively moving for the irradiation point of the working laser beam, a rear portion in the progressing direction of the working where the auxiliary energy is irradiated reaches a higher temperature than the front portion thereof. This is inconvenient since it results in wasted consumption of energy and causes distortion.

SUMMARY OF THE INVENTION

It is an object of the present invention to provide a laser machining apparatus which can work a workpiece in a short time and can perform the working with a high degree of accuracy and with extremely high working efficiency and also high working speed by use of an auxiliary energy source as effectively as possible even in the case where a particularly thick workpiece is to be worked.

The gist of the invention is as follows. In a laser machining apparatus which allows a laser beam from a laser generator to be focused by a focusing lens and works a workpiece while radiating the laser beam thereon, a plasma generating apparatus or other auxiliary energy sources is provided, and at the same time the radiating portion of the laser beam onto the workpiece and the radiating position of the auxiliary energy are slightly shifted. Preferably, the auxiliary energy is always radiated onto the portion which precedes the irradiation point of the working laser beam in the progressing direction of the work. In the case where the workpiece is a relatively thin material, the laser beam and auxiliary energy may be respectively radiated onto opposite sides of the workpiece. With such an arrangement, there is provided a laser machining apparatus with simple arrangement and with less failure in which the auxiliary energy can be utilized effectively and the apparatus can be easily handled.

As an auxiliary energy source, a plasma, Xenon light, glow discharge, corona discharge, or an auxiliary laser beam or the like are useful.

The case of using a plasma jet as an auxiliary energy source, the exhausted gas from the laser generator can be utilized as a part of the plasma gas.

In several desirable embodiments of the laser machining apparatus according to the present invention as mentioned above, various supplementary means can be also used in order to allow the working by the laser beam and auxiliary energy to be performed further efficiently. Namely, a working fluid such as water, acid, alkali, or the like is supplied as a high-pressure jet to the portion on the workpiece where the laser beam is radiated, thereby facilitating the working. Also a working fluid such as acid, alkali or the like is supplied to the portion to be worked, and at the same time 80% or more of the working fluid is evaporated by the working laser beam, thereby performing the working efficiently. Further, the working fluid can be subjected to ultrasonic vibrational energy and supplied to the working portion or the portion immediately after completion of the working. Additionally an abrasive grain can be discharged against the working portion. Furthermore, the working can be performed in an atmosphere of halogen gas. Moreover, in order to automatically adjust the focal point of the laser beam, it is also possible to provide means for sensing infrared rays radiated from the working portion, thereby adjusting the position of the focal point so that the quantity of the infrared radiation becomes maximum. It is also possible to provide means for radiating a sighting light toward the workpiece, thereby automatically adjusting the position of the focal point of the laser beam by use of the sighting light reflected from the workpiece.

The above objects, arrangements, functions, and effects of the present invention will be more apparent from the following detailed description in conjunction with the accompanying drawings.

DETAILED DESCRIPTION OF THE PREFERRED EMBODIMENTS

Figure 1:
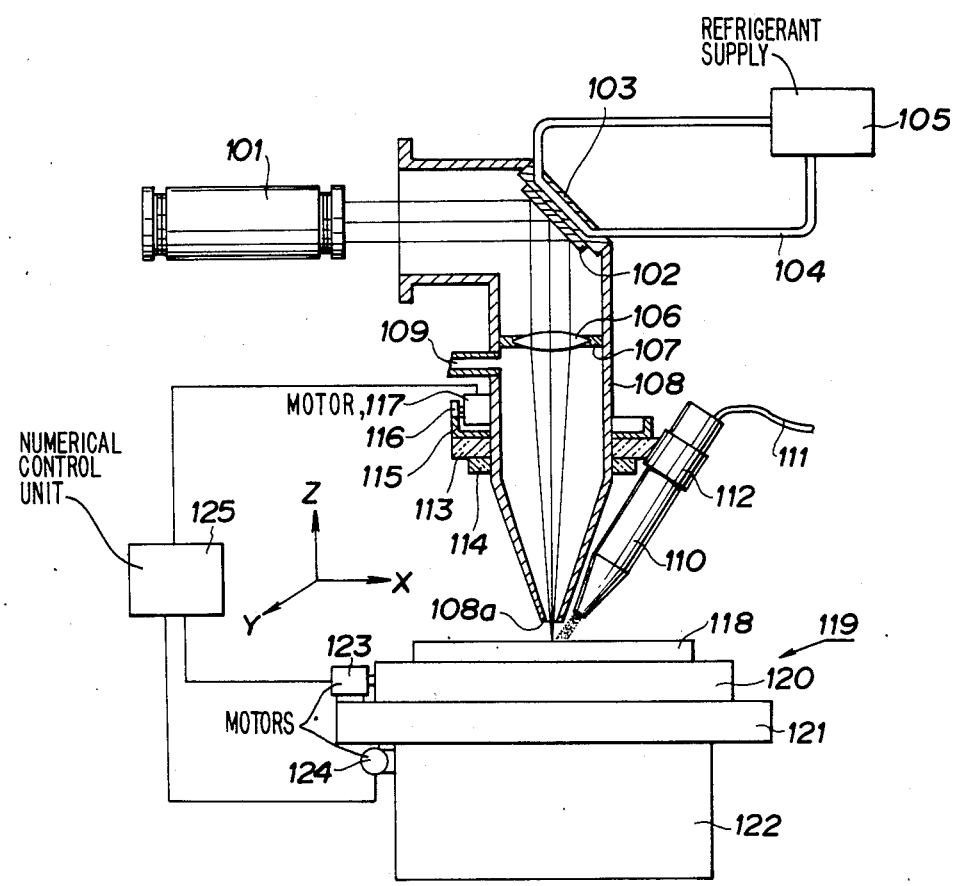
FIG. 1 is a diagram showing one embodiment of a laser machining apparatus according to the present invention in which a plasma is used as auxiliary energy and the plasma is radiated onto a portion of a workpiece which is precedent from the position where a working laser beam is radiated.

FIG. 1 illustrates one embodiment of a laser machining apparatus in which a plasma jet as auxiliary energy source is radiated onto a position of a workpiece which precedes the position where a working laser beam is radiated in the working progressing direction according to the present invention.

In FIG. 1, reference numeral 101 denotes a laser generator; 102 is a reflection mirror; 103 a member to attach the reflecting mirror; 104 a piping system for cooling; 105 a refrigerant supplying apparatus to supply cooling water or the like; 106 a focusing lens; 107 a member to fix the lens; 108 a housing; 109 a working gas supply port; 110 a plasma gun; 111 a plasma gas supply tube; 112 a member to attach the plasma gun; 113 a rotary disk; 114 a rotary disk attaching base; 115 a crown gear; 116 a pinion gear; 117, 123 and 124 motors; 118 a workpiece; 119 a cross slide table; 120 a traveling table in the direction of the X axis; 121 a traveling table in the direction of the Y axis; 122 a base; and 125 a numerical control unit.

In the embodiment, a plasma generating apparatus was used as an auxiliary energy supplying apparatus; however, in place of this, it is also possible to use a discharging apparatus such as an arc discharge, high-frequency pulse discharge or the like, or a laser generator different from the working laser generator.

For the laser generator 101, it is possible to use any gas laser such as a $CO_2$ laser, He-Ne laser, etc., a liquid laser, a solid state laser such as a ruby laser, YAG laser, etc., or a semiconductor laser. The power of such a laser generator can be increased by means of a pulsating oscillation using a Q-switching method. On the other hand, the magnitude of energy density of the laser beam is controlled by a control unit (not shown) connected to the laser generator 101.

The reflecting mirror 102 is attached to the mirror attaching member 103 fixed to the housing 108 and is constituted such that it has an angle of 45° to the optical axis of the laser beam generated from the laser generator 101, thereby allowing the optical path of the laser beam to be changed by an angle of 90°.

The piping system 104 for cooling is arranged such that it passes through the mirror attaching member 103 and cooling water is supplied through the piping system 104 by the refrigerant supplying apparatus 105, thereby cooling the reflecting mirror 102 and the attaching member 103.

The housing 108 is a hollow box and is constituted in the manner such that the central axis of the cylindrical pipe at its central portion coincides with the optical axis of the laser beam reflected by the reflecting mirror 102. One end of the housing 108 is formed like a tapered shape and a working gas exhausting nozzle 108a is provided at the end.

The laser beam reflected by the reflecting mirror 102 is focused by the lens 106 and is converged to a working point on the workpiece 118.

The lens fixing member 107 is positioned and attached to the housing 108 such that the focal point of the lens 106 coincides with the working point on the workpiece 118.

In the arrangement in which the position of the housing 108 is fixed to the workpiece 118, the lens 106 may be necessary to be controlled and moved along the optical axis of the laser beam in response to a programmed command or the like. However, in general, the housing 108 or cross slide table 119 are controlled to be moved away or towards each other and the converged focal point of the laser beam in the direction of a thickness of the workpiece 118 to be worked can be changed.

In addition, the lens 106 and lens fixing member 107 also serve as pressure resistant members to seal the working gas which is supplied into the housing 108.

A working, i.e., a halogen, furon of various kinds, water vapor, oxygen, inert gases, carbon dioxide, or mixtures of these gases is supplied through the working gas supply port 109 into the housing 108 in accordance with the kind of workpiece 118. These gases are concentratedly discharged from the gas exhausting nozzle 108a of the housing 108 to the irradiation point of the laser beam.

By discharging the working gas to the irradiation point of the laser beam, the working by the main working laser is carried out effectively, and at the same time the extent of the round edge in the cross section is reduced; furthermore, it becomes possible to drain the working debris rapidly.

A plasma gas is supplied from the gas supply tube 111 to the plasma gun 110, and a voltage is applied thereto by a plasma power source (not shown), so that the plasma gun generates a plasma. The plasma jet gun is attached to the rotary disk 113 with the attaching member 112 in the manner such that the radiating direction of the plasma jet has an angle of 20° to 50° relative to the optical axis of the laser beam.

In addition, the magnitude of energy density of the plasma jet can be changed by controlling the plasma power source apparatus (not shown).

The rotary disk 113 is annular so as to surround the outer periphery of the housing 108 and is rotatably mounted on the attaching base 114 fixed to the housing 108.

The crown gear 115 engages the pinion gear 116 fixed to an axis of the motor 117 and is fixed to the rotary disk 113 coaxially, so that it is rotated integrally therewith.

With such an arrangement, the plasma gun 110 is rotated integrally with the rotary disk 113 around the optical axis of the working laser beam, so that the radiating position of the plasma jet can be coaxially rotated around the irradiation point of the main laser beam and its rotational angle can be set to an arbitrary value of 0° to 360°.

The workpiece 118 is attached to the traveling table 120 which is movable along the X axis of the cross slide table 119. The traveling table 120 is movable along the X axis and the traveling table 121 along the Y-axis by the motors 123 and 124. Thus, the workpiece 118 is moved two-dimensionally in the same plane.

In accordance with a predetermined program, the numerical control unit 125 controls the motors 123 and 124, thereby allowing the workpiece 118 attached to the cross slide table 119 to be moved in desired position and direction at a predetermined speed. At the same time, in accordance with the working progressing direction which is determined by signals sent to the motors 123 and 124, the control unit 125 makes the motor 117 operative for allowing the rotary disk 113 to be properly rotated, such that the radiating position of the plasma jet is always head in the working progressing direction of the irradiation point of the working laser beam.

The working laser beam generated from the laser generator 101 is reflected by the reflecting mirror 102 and its optical path is changed, thereafter it is focused by the lens 106 and is converged onto the working point on the workpiece 118.

On the other hand, the plasma gun 110 is constituted such that it is rotated integrally with the rotary disk 113 and can be set to an arbitrary position. The numerical control unit 125 controls the motors 123 and 124 and determines the working progressing direction of the workpiece 118, and at the same time it controls the motor 117 in correspondence to the working progressing direction to rotate the rotary disk 113, such that the position of the plasma gun 110 attached to the rotary disk 113 is always precedent in the working progressing direction for the irradiation point of the working laser beam. Therefore, the plasma generated from the plasma gun 110 is always irradiated on the precedent portion in the working progressing direction for the irradiation point of the working laser beam.

Figure 2:
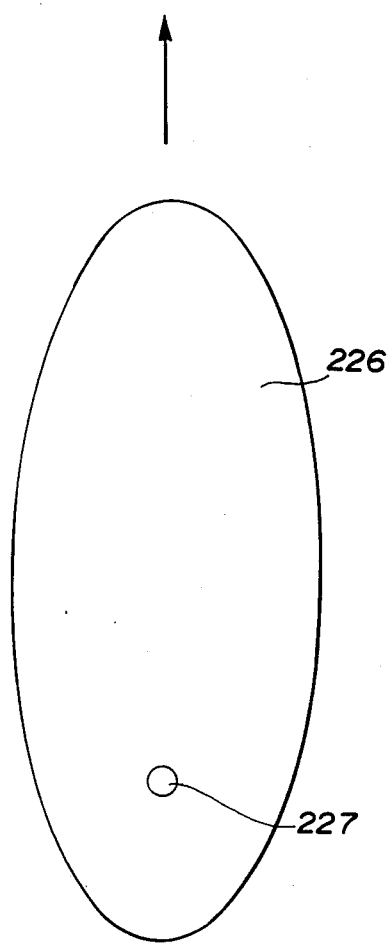
FIG. 2 is a diagram showing the positional relation between the irradiation point of the working laser beam and the position where the plasma is radiated in the laser machining apparatus according to the present invention shown in FIG. 1.

FIG. 2 is an explanatory diagram showing the positional relationship between the radiating position of the plasma jet and the irradiation point of the working laser beam.

In the diagram, numeral 226 denotes a portion onto which the plasma is radiated and 227 indicates a point at the highest temperature.

In the preferred embodiment, as shown in the diagram, the portion 226 where the plasma jet is radiated extends in an elliptical form and a major axis of the ellipse is always held in the working progressing direction indicated by an arrow in the diagram, and the laser beam is radiated onto the point 227 at the highest temperature on the irradiation surface.

Consequently, the working point of the laser beam is most efficiently preheated, so that the working is performed by use of the minimum laser energy and the thermal distortion also becomes minimum.

On the other hand, the NC program by which the location of the plasma gun 110 is controlled is obtained by a simple arithmetic operation from the main program which determines the contour to be cut out.

As described above, in the laser machining apparatus shown in FIG. 1, the auxiliary energy is always radiated onto the portion which is precedent in the working progressing direction for the irradiation point of the main laser beam, so that the heating by the auxiliary energy is effectively performed, thereby enabling energy efficiency and working accuracy of the apparatus to be improved.

Figure 3:
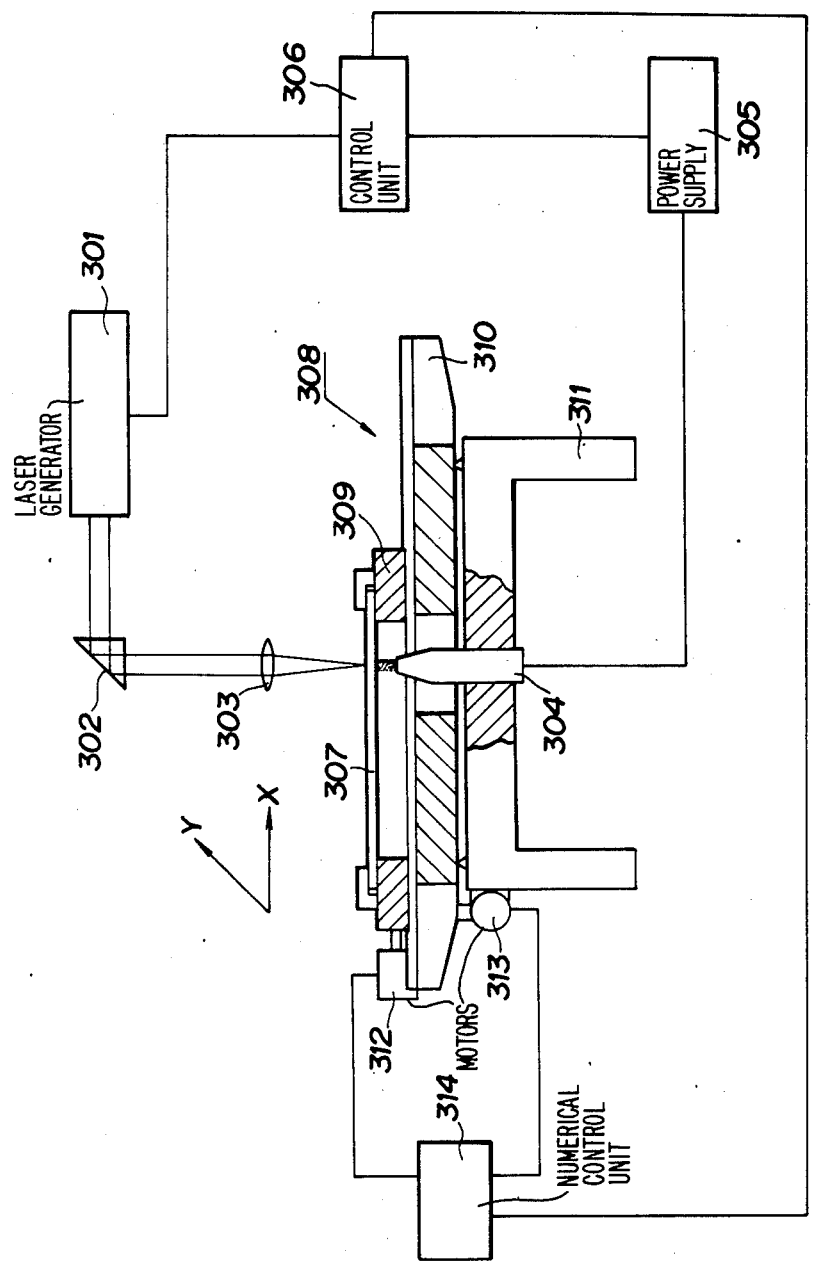
FIG. 3 is a diagram showing one embodiment in which a plasma as auxiliary energy is radiated onto a workpiece from the side opposite to the working laser beam.

FIG. 3 illustrates an embodiment of the laser machining apparatus in which a plasma jet as auxiliary energy is irradiated on a workpiece from the side opposite the working laser beam in accordance with the present invention.

In FIG. 3, reference numeral 301 represents a laser generator; 302 is a prism; 303 a focusing lens; 304 a plasma generating apparatus; 305 a power supply unit; 306 a control unit to control the laser generator 301 and power supply unit 305; 307 a workpiece; 308 a cross slide table; 309 a traveling table movable in the direction of the X axis of the cross slide table; 310 a traveling table movable in the direction of the Y axis; 311 a base; 312 and 313 motors; and 314 a numerical control unit.

There are omitted means for supplying the cooling fluid and gas to the plasma generating apparatus, means for supplying a desired gas to the working portion, means for atmosphere controlling, and further means for draining vapor and gas which are generated from the working portion.

Similarly to the case of the embodiment shown in FIG. 1, any of the gas laser, liquid laser, solid state laser, and semiconductor laser can be used for the laser generator 301.

The laser beam generated from the laser generator 301 is reflected by the prism 302. The laser beam reflected by the prism 302 is focused by the focusing lens 303 and is converged onto the point to be worked on the workpiece 307.

In the embodiment, the plasma generating apparatus 304 is attached at the central portion of the base 311 of the cross slide table 308. The laser beam generated from the laser generator 301 is irradiated on the workpiece 307 from the direction opposite to that of the plasma from the plasma jet generating apparatus 304 such that they sandwich the workpiece therebetween. Alternatively, the plasma generating apparatus 304 may be disposed above the workpiece 307 and the laser generator 301 may be disposed at the location of the plasma generating apparatus 304 at the lower location in the diagram or may be disposed below the plasma generating apparatus 304. Otherwise, the laser beam generated from the laser generator 301 may be radiated to the workpiece 307 from the location of the plasma generating apparatus 304 while the plasma may be irradiated from the upper side so that they sandwich the workpiece 307 therebetween by means of suitable combination of prisms, reflecting mirrors or the like.

A voltage is applied to the plasma generating apparatus 304 by the power supply unit 305, so that the apparatus 304 generates the plasma.

In this embodiment, the plasma generating apparatus 304 for generating a plasma jet, namely, non-moving type plasma is used; however, a plasma generating apparatus for generating a plasma arc, i.e., moving type plasma may be used.

The control unit 306 controls the laser generator 301 and power supply unit 305, thereby changing power densities of the laser beam generated from the laser generator 301 and of the plasma jet generated from the plasma generating apparatus 304. At the same time, the laser beam and plasma jet can be respectively set to be continuous, or strong and weak, or pulse oscillatory. However, it is desirable to set at least one of them to have pulse oscillation.

In the embodiment, for example, the plasma jet is set to be continuous and the laser beam is set to be pulsating. But, when a high degree of working accuracy is required, the laser beam can be switched between the continuous oscillation and the pulse oscillation, or the intermittent light emission by a proper means in accordance with the contour which should be cut out from the workpiece 307.

In the above case, the laser generator 301 is constituted and controlled in the manner such that it performs continuous oscillation at the rectilinear portion of the contour to be cut, while it performs pulse oscillation when a curved portion having a small curvature or a corner portion is to be worked.

The workpiece 307 is attached to the traveling table 309 which is movable along the X axis of the cross slide table 308.

The traveling table 309 is formed as a frame by cutting out the central portion of a plate-like member. The traveling table 310 is movable along Y-axis and has a longitudinal hole extending in the Y-axis direction at its central portion. These traveling tables 309 and 310 are constituted such that when the laser beam and plasma jet are arranged to face each other so as to sandwich the workpiece 307 therebetween and are radiated to perform the working, they do not obstruct the radiation of the plasma jet or laser beam.

The motor 312 moves the traveling table 309 in the direction of the X axis, while the motor 313 moves the traveling table 310 in the direction of the Y axis in the diagram.

Both motors 312 and 313 are connected to the numerical control unit 314. The numerical control unit 314 controls the motors 312 and 313 in accordance with a predetermined program, thereby allowing the workpiece 307 attached to the traveling table 309 to be moved two-dimensionally in the same plane so that the workpiece is cut out along a desired contour.

The control unit 306 is connected to the numerical control unit 314. When the numerical control unit 314 controls the motors 312 and 313 and thereby determines the speed and direction for cutting of the workpiece 307, a signal to control the control unit 306 is also generated from the numerical control unit 314. In response to the signal, the control unit 306 controls powers of the laser generator 301 and power supply unit 305.

Further, in the case where a high degree of working accuracy is required, the control unit 306 can set the laser beam generated from the laser generator 301 to the continuous oscillation or pulse oscillation in accordance with the speed and contour for cutting the workpiece 307.

The laser beam generated by the laser generator 301 is reflected or its optical path is changed by the prism 302 and other reflecting mirrors which are appropriately provided. The laser beam is focused by the focusing lens 303 and is converged onto the irradiation point of the workpiece 307.

On the other hand, the plasma jet generated by the plasma generating apparatus 304 is radiated from the back side of the workpiece 307 to the position corresponding to the irradiation point of the laser beam or to the location which is slightly precedent in its working advancing direction.

The workpiece 307 attached to the traveling table 309 in the X-axis direction is moved two-dimensionally in the same plane in response to a command from the numerical control unit 314 in accordance with a predetermined program, so that it is cut along a desired contour.

When the workpiece 307 is cut by the energies of the laser beam and plasma jet, since the workpiece 307 is heated to a constant temperature by the plasma jet, the power density of the laser beam can be set lower than that in the case of the working only by the laser beam. Therefore, the laser generator 301 with a low power can be used, so that the apparatus becomes less expensive.

In addition, since the laser radiating apparatus and the plasma generating apparatus can be separately installed without combining them, there is less restriction on design and the arrangement can be simplified with its easy handling.

On the other hand, in the embodiment shown in FIG. 3, the laser beam and plasma have been disposed on the same axis. However, they may be arranged so that their axes cross at an angle of a few degrees to tens of degrees. Furthermore, instead of fixing the relative locations of the laser beam and plasma, it is also possible, for instance, to control the location and position of the plasma generating apparatus so that the radiating position of the plasma can be always precedent from the radiating position of the laser beam in the working progressing direction.

Figure 4:
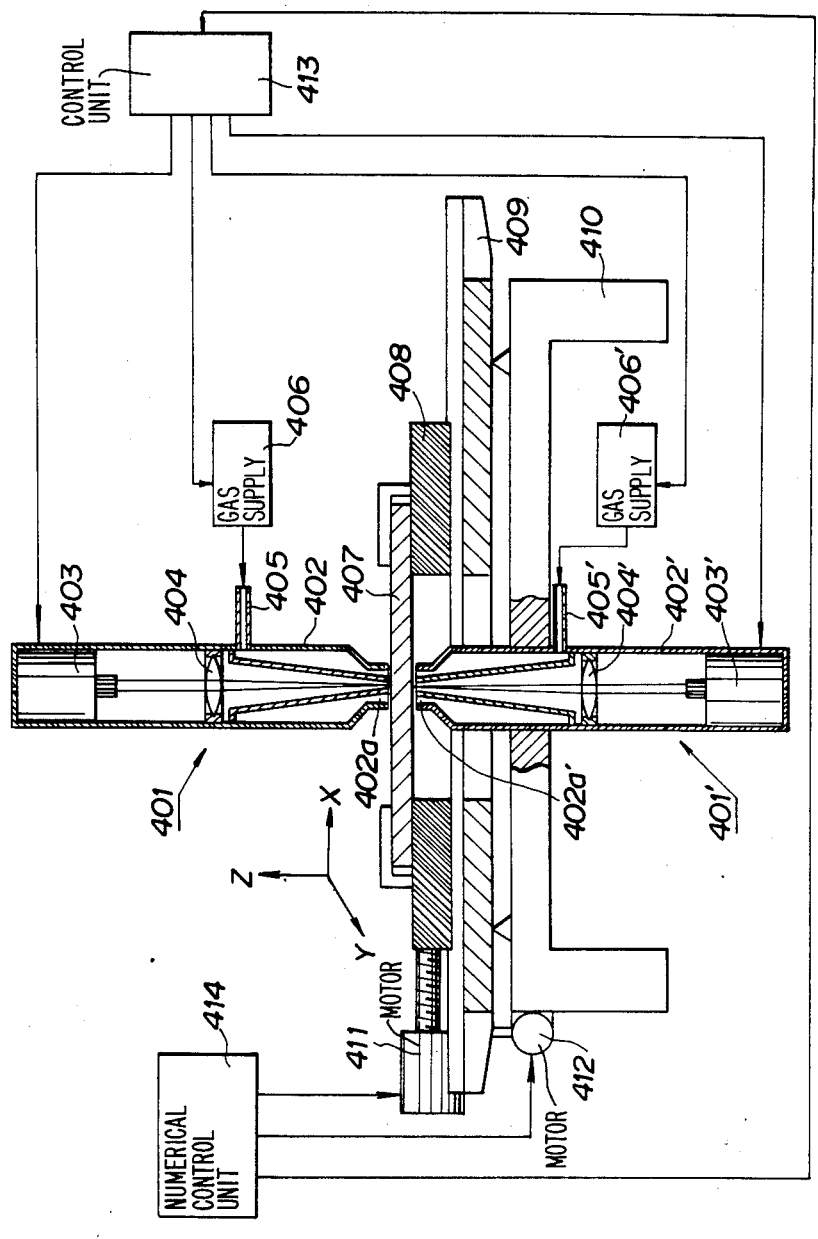
FIG. 4 is a diagram showing one embodiment in which a laser beam as auxiliary energy is radiated onto a workpiece from the side opposite to the working laser beam.

FIG. 4 illustrates another embodiment of the laser machining apparatus in which a laser beam as auxiliary energy is radiated on a workpiece from the side opposite the working laser beam.

In FIG. 4, numeral 401 indicates a laser radiating apparatus to radiate a laser beam from the upper side of a workpiece; 401' is a laser radiating apparatus to radiate a laser beam from the lower side of the workpiece;

402 and 402' housings; 402a and 402a' output ports at the ends of the above housings; 403 and 403' laser generators; 404 and 404' focusing lenses; 405 and 405' working gas supply tubes; 406 and 406' working gas supplying apparatuses each for supplying a working gas such as a halogen gas or the like; 407 a workpiece; 408 and 409 cross slide tables to move the workpiece 407 in the directions of the X and Y axes respectively; 410 a base on which the cross slide tables are mounted; 411 and 412 motors to drive the cross slide tables; 413 a control unit to control the laser generators 403 and 403' and the working gas supplying apparatuses 406 and 406'; and 414 a numerical control unit to totally control the motors 411 and 412 to drive the cross slide tables and the control unit 413 in accordance with a predetermined program.

When working, the laser beams generated from the laser generators 403 and 403' are focused by the focusing lenses 404 and 404' and are radiated to the working portion of the workpiece 407 from the upper and lower sides thereof through the output ports 402a and 402a' of the housing 402 and 402'. At the same time, the working gas such as halogen or the like supplied from the working gas supplying apparatuses 406 and 406' are discharged onto both upper and lower sides of the workpiece. The laser beam from the lower laser generator 403' is radiated to the portion corresponding to the irradiation point of the laser beam from the upper laser generator 403 or to the portion which is slightly precedent therefrom in its working progressing direction, so that the working is carried out.

The working gas is not limited to halogen, and furon gas of various kinds, water vapor, pure oxygen gas or proper mixture of these gases may be used in accordance with the material and cutting shape or the like of the workpieces.

In the laser machining apparatus in the embodiment of FIG. 4, the workpiece 407 is worked by the laser beams and working gases from both of the upper and lower surfaces simultaneously; thus, even in the case where a thick workpiece is cut and worked, the working can be performed in a short time and with high accuracy.

Namely, in case of working by radiating the laser beam only from one side of the workpiece, the cutting and working could be performed at a working speed of 1.5 m/min according to the following experiment. That is, a $CO_2$ laser having a wavelength of 10.6 μm and a power of 350 W was radiated to the S55C steel having a thickness of 2.5 mm from only one side while discharging pure oxygen gas coaxially with the laser radiation beam. In addition, a workpiece of the same material with a thickness of 8 mm was worked under the same conditions. Thus, the cutting was done at a working speed of 1 m/min. In these case, the working accuracy was ±0.08 mm. On the other hand, the experiment was carried out using the laser machining apparatus according to the present invention as shown in FIG. 4. Namely the $CO_2$ laser having a wavelength of 10.6 μm and a power of 250 W was used for the upper laser generator 403. As the lower laser generator 403', a generator similar to the upper one is used, while a power of such a generator 403' was set at 80 W. The S55C material having the same thickness of 2.5 mm as that which had been used in the foregoing experiment was worked while discharging pure oxygen from the sides of the respective laser radiation beams. Thus, the working could be effected at a working speed of 2.5 m/min. In addition, a workpiece of the same material with a thickness of 8 mm was worked under the same conditions, so that the working could be performed at a working speed of 3.5 m/min and the working accuracy of ±0.05 mm. The working speed was clearly increased by about three times as compared with the conventional system and the working accuracy was remarkably improved.

Further, although it was difficult to work 18-8 stainless steel of a thickness of 2.5 mm by the conventional laser machining apparatus, it is possible to easily work it by the laser machining apparatus according to the present invention. Also, such a stainless steel having a thickness of up to 8 mm could be worked by the present apparatus.

Figure 5:
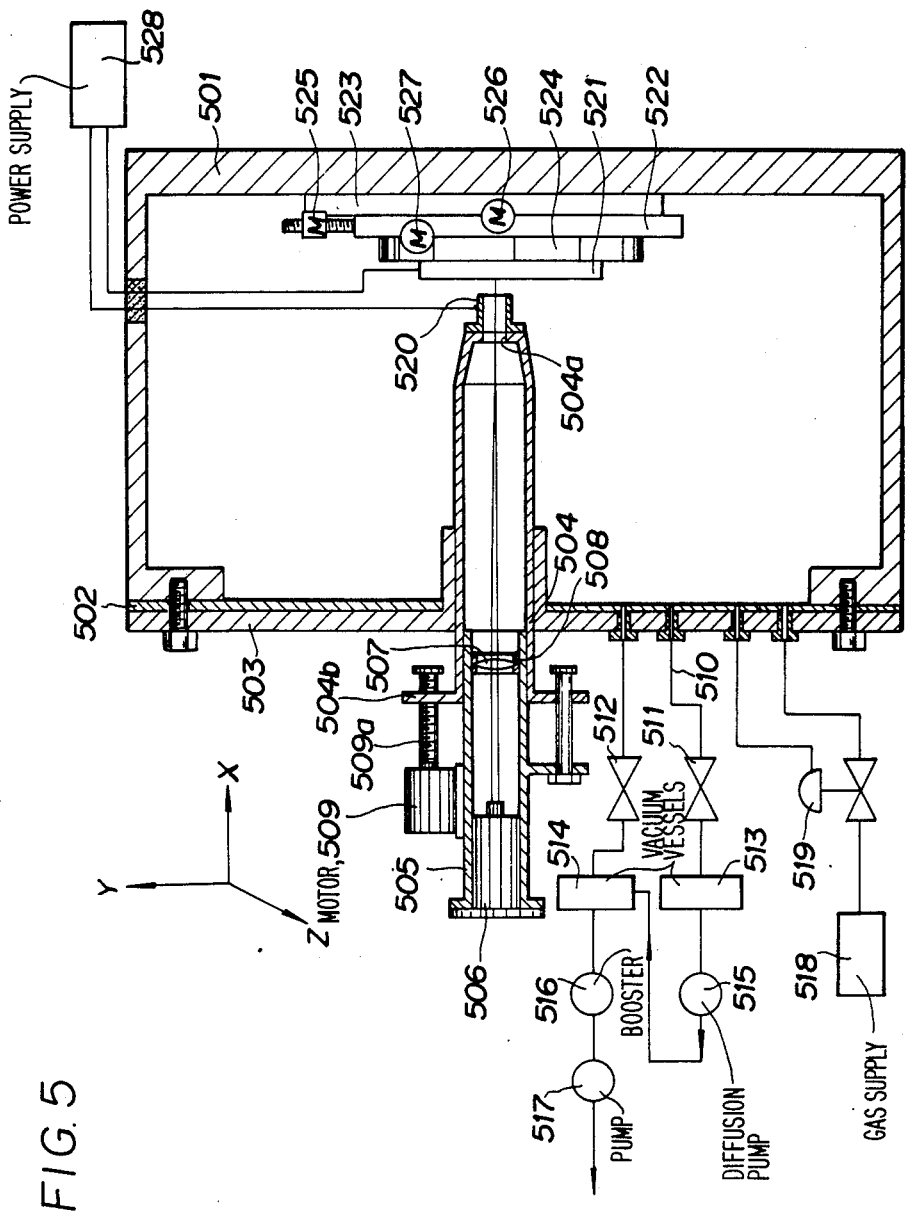
FIG. 5 is a diagram showing one embodiment in which a glow or corona discharge as auxiliary energy is radiated onto the portion around the working laser beam.

FIG. 5 illustrates an embodiment of the laser machining apparatus in which a glow or corona discharge as auxiliary energy is radiated around the working laser beam irradiated portion.

In FIG. 5, numeral 501 denotes a pressure reducing chamber; 502 is a packing; 503 a cover member to sealingly close the pressure reducing chamber 501; 504 and 505 housings for the laser radiating apparatus; 504a an opening formed at the end of the housing 504; 504b a flange formed integrally with the housing 504; 506 a laser generator attached to the housing 505; 507 a focusing lens attached in the housing 505; 508 a fixing member to fix the focusing lens; 509 a motor; 509a a shaft of the motor; 510 an exhausting pipe; 511 and 512 valves; 513 and 514 vacuum vessels having appropriate volumes; 515 a diffusion pump; 516 a mechanical booster; 517 a rotary vacuum pump; 518 a halogen gas supplying apparatus to supply a halogen gas or a gas of halogen compound; 519 a pressure control valve; 520 an electrode attached to the housing 504; 521 a workpiece; 522 and 523 cross slide tables which are disposed in the pressure reducing chamber 501 and move the workpiece 521; 524 a turntable mounted on the cross slide tables for applying the rotational motion to the workpiece 521; 525, 526 and 527 motors to respectively drive the cross slide tables and turntable; and 528 a power supply unit which is connected between the electrode 520 and the workpiece 521 or the turntable 524 on which the workpiece is placed. This power supply unit 528 supplies a direct current at a high voltage, a high frequency, or a pulsating current to heat the workpiece 521 due to glow or corona discharge. The electrode 520 may be disposed at a proper location such as at the inner surface of the cover member 503.

The cross slide tables 522 and 523 and turntable 524 are fixed in the pressure reducing chamber 501. The workpiece 521 is fixed on the turntable 524. The pressure reducing chamber 501 is sealingly closed by the cover member 503 through the packing 502. The inside of the pressure reducing chamber 501 is maintained at a degree of vacuum, e.g., 1-10 Torr or less, which is necessary for the operation of the diffusion pump 515. Such a degree of vacuum can be relatively easily derived by the mechanical booster 516 and rotary vacuum pump 517. Also, the inside of the vacuum vessel 514 is reduced to a pressure of $10^{-2}$–$10^{-3}$ Torr. A halogen or halogen oxide gas is supplied from the gas supplying apparatus 518 through the pressure control valve 519 into the pressure reducing chamber 501 which was made vacuous. Preferably, the halogen gas at a low pressure is jetted by being directed near the working portion of the workpiece 521 by a nozzle whose position can be adjusted and controlled.

The laser generator 506 is attached to one end of the housing 505. In this embodiment, although the system having a single laser radiating apparatus has been illustrated, the number of the laser generators may be changed arbitrarily in accordance with the working conditions such as the material, shape, size, etc., of the workpiece 521.

The laser beam generated from the laser generator 506 is converged by the focusing lens 507 and is radiated onto the working portion of the workpiece 521.

At the joint portion of the housings 504 and 505, the outer diameter of the housing 505 is set to be substantially equal to the inner diameter of the housing 504 and the housing 505 is slidably attached to the housing 504. The motor 509 is attached to the outer surface of the housing 505. Its shaft 509a is threaded and engages the female threads formed on the flange 504b of the housing 504. Therefore, the housing 505 can be moved in the direction of the X axis in response to the rotation of the motor 509 attached thereon. The electrode 520 is attached to the opening end of the housing 504 to face the workpiece 521. A direct current, a high frequency current or a pulsating current at a high voltage is supplied from the power supply unit 528 between the electrode 520 and workpiece 521, thereby heating the workpiece 521 due to the glow or corona discharge. Preferably, the working portion is more concentratedly heated by a close arrangement of the electrode 520 and the workpiece 521 as shown in FIG. 5.

In addition, in accordance with a predetermined program, a numerical control unit (not shown) controls: the motor 509 to move the housing 505 along the X axis; the motors 525 and 526 to move the cross slide tables 522 and 523 respectively; the motor 527 to rotate the turntable 524; the adjustment of a degree of vacuum in the pressure reducing chamber 501; the quantity of halogen gas which is supplied from the halogen gas supplying apparatus 518; the power supply unit 528 which supplies a predetermined voltage between the electrode 520 and the workpiece 521 thereby causing the glow or corona discharge or the like in the pressure reducing chamber 501 using the workpiece 521 as a pole; etc.

In the case where the working is carried out by the laser machining apparatus according to the present invention as shown in FIG. 5, the inside of the pressure reducing chamber 501 is kept at about 1-10 Torr or less by the mechanical booster 516 and rotary vacuum pump 517. When a high voltage is applied from the power supply unit 528 between the electrode 520 (anode) and the workpiece 521 (cathode) in such a lowered pressure state, a glow discharge is generated. Thus, the above discharge voltage is reduced and the glow discharge is maintained constantly, whereby the workpiece 521 is appropriately heated. The halogen gas such as $Cl_2$, $F_2$ or the like or the gas of halogen compound such as Freon or the like is supplied thereto from the gas supplying apparatus 518. Thereafter, the laser beam from the laser generator 506 is focused to about $10^4$–$10^8$ W/cm$^2$ by the focusing lens 507 and is radiated to the working portion of the workpiece 521. Consequently, the temperature of the working portion on the surface of the workpiece 521 is raised and a part of metal molecules of the working portion are ionized and removed, thereby performing the working.

Therefore, the workpiece 521 is worked effectively in a short time under the action of the glow discharge and the action of the heat produced as the result of the halogen gas or the halogen compound gas emitted to the laser beam.

In this case, the auxiliary energy is not limited to the glow or corona discharge but an arc discharge may be used.

As described above, in the case of this embodiment, the corona or glow discharge as auxiliary energy is generated at the location slightly shifted from the irradiation point of the main working laser beam such that it surrounds the irradiation point of this laser beam. Therefore, the auxiliary energy is applied efficiently and an arrangement of the system is simplified.

Another embodiment of the laser machining apparatus of the present invention will now be described with reference to FIG. 6 in which abrasive grain is discharged to the working portion in addition to the corona or glow discharge or arc discharge as the auxiliary energy, thereby performing the working.

Figure 6:
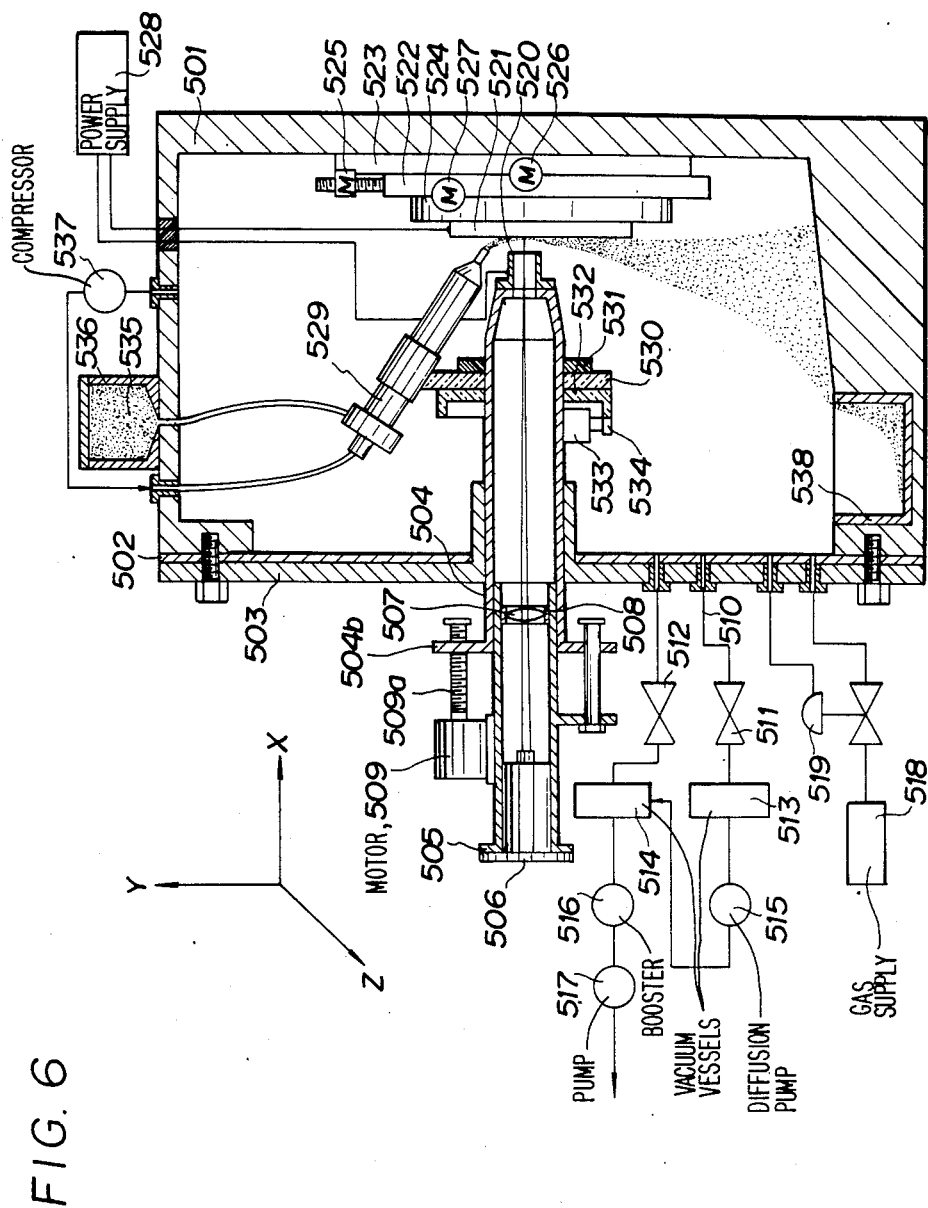
FIG. 6 is a diagram showing one embodiment in which a glow or corona discharge as auxiliary energy is radiated onto the portion around the working laser beam and at the same time abrasive grain is spouted toward the working portion.

In FIG. 6, the same parts and components as those shown in FIG. 5 are designated by the same reference numerals. Further, numeral 529 denotes an abrasive grain discharging apparatus attached to the outer surface of the housing 504; 530 is a rotary disk; 531 a rotary disk attaching base; 532 a crown gear; 533 a motor; 534 a pinion gear which is attached to a shaft of the above motor and is in engagement with the above crown gear; 535 an abrasive grain; 536 an abrasive grain tank to supply the abrasive grain 535 to the abrasive grain discharging apparatus 529; 537 a compressor which compresses the halogen gas or gas of halogen compound in the pressure reducing chamber 501 and supplies it to the abrasive grain discharging apparatus 529; and 538 a box to collect the abrasive grain.

In the system of this embodiment, in addition to the system shown in FIG. 5, the abrasive grain 535 is discharged and supplied at a high pressure to the working portion of the workpiece 521.

Namely, the rotary disk 530 is formed annularly so as to surround the outer surface of the housing 504 and the abrasive grain discharging apparatus 529 is attached to one end thereof. This rotary disk 530 is rotatably attached to the base member 531 fixed to the housing 504. The crown gear 532 is fixed to the rotary disk 530 coaxially with its rotary axis so as to come into engagement with the pinion gear 534 attached to the shaft of the motor 533 and is rotated in association with the rotation of the motor 533.

The quantity of abrasive grain which should be discharged from the discharging apparatus 529 and the rotation of the motor 533 for the discharging apparatus 529 are together controlled by a numerical control unit (not shown) similarly to the system shown in FIG. 5.

In execution of the working by this laser machining apparatus, the inside of the pressure reducing chamber 501 is maintained at about 1-10 Torr or less by the mechanical booster 516 and rotary vacuum pump 517 and the like. In this condition, when a voltage is applied from the power supply unit 528 between the electrode 520 (anode) and the workpiece 521 (cathode), the glow discharge is produced. Then, the above-mentioned discharge voltage is reduced and the glow discharge is kept constantly, thereby the workpiece 521 is heated. The halogen gas such as $Cl_2$, $F_2$ or the like, or the halogen compound gas such as Freon is supplied from the gas supplying apparatus 518 thereto. Thereafter, the laser beam from the laser generator 506 is focused at about $10^4$–$10^8$ W/cm$^2$ by the focusing lens 507 and is radiated to the working portion of the workpiece 521. Further, in addition to the above operation, the abrasive grain 535 is discharged at a high pressure from the abrasive grain discharging apparatus 529 toward the portion to be worked of the workpiece 521. The supply of the abrasive grain 535 by the discharging apparatus 529 is carried out so as to be precedent in the working progressing direction at the irradiation point of the laser beam.

The current of the glow discharge concentratedly flows through the portion to be worked of the workpiece 521. At the same time, a temperature of the portion is raised by the laser beam from the laser generator 506. Thus, a part of metal molecules of the surface of the workpiece 521 are ionized and removed. Furthermore, since the abrasive grain 535 is supplied at a high pressure to the working portion from the abrasive grain discharging apparatus 529, the workpiece 521 is worked in a short time by the combination of these various actions.

That is, the workpiece 521 is worked effectively in a short time under the action of the glow discharge, the thermal and chemical actions which are caused as the result of the halogen gas or gas of halogen compound being radiated by the laser beam, and the action of the abrasive grain 535 supplied at a high pressure from the abrasive grain discharging apparatus 529.

As described above, in the system shown in FIG. 6, it is possible to perform the working by desired combination of the glow discharge, laser beam, halogen gas or halogen compound gas, and abrasive grain. Therefore, even if the working is particularly difficult, such as in case of a metal or the like, the working can be certainly carried out in a short time.

Figure 7:
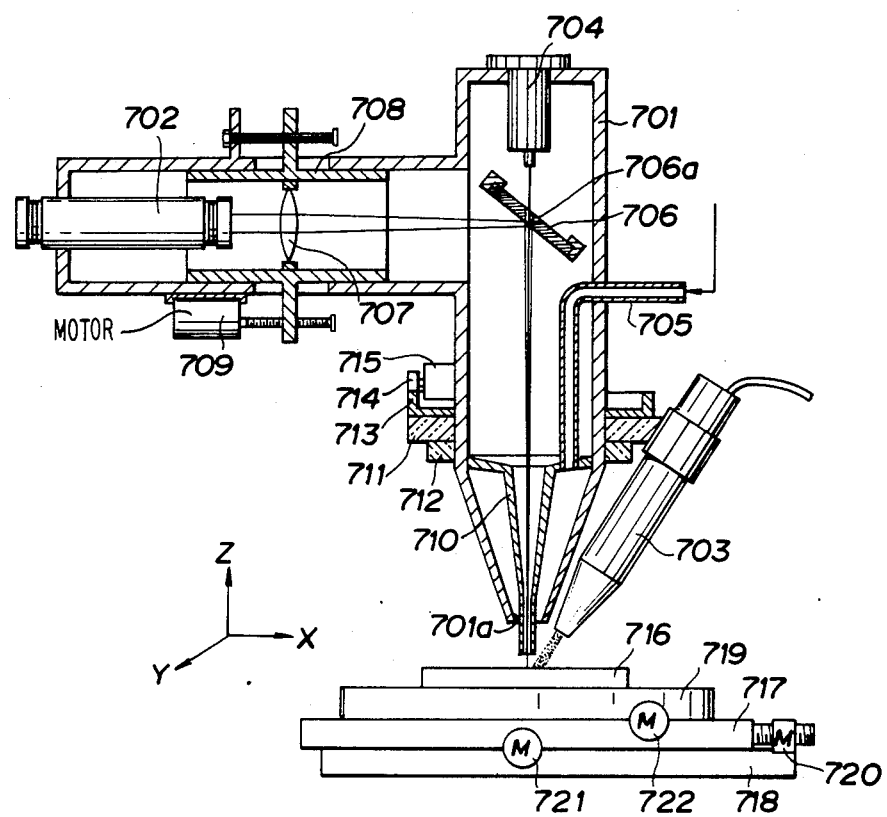
FIG. 7 is a diagram showing one embodiment in which a Xenon light is used as auxiliary energy and a plasma gas and a high-pressure fluid are supplied to the working portion.

Referring now to FIG. 7, there is illustrated an embodiment of the laser machining apparatus in which a Xenon light is radiated to the location which is slightly shifted from the irradiation point of the main working laser beam and further a plasma gas and a high-pressure fluid are supplied, thereby working is carried out.

In FIG. 7, numeral 701 represents a housing; 701a is an opening end at the point of the housing 701; 702 a laser generator; 703 a Xenon light source; 704 a high-pressure fluid supplying apparatus; 705 a plasma gas supply tube; 706 a reflecting mirror; 707 a focusing lens; 708 a focal point adjusting pipe to which the above focusing lens is attached and which is slidably attached to the housing 701; 709 a motor to move the focal point adjusting pipe 708; 710 a funnel-like bulkhead nozzle to separate the opening portion 701 of the housing into the exhaust nozzle for the laser beam and high-pressure fluid jet and into the exhaust nozzle for the plasma gas; 711 a rotary disk to which the Xenon light radiating apparatus 703 is attached; 712 a rotary disk attaching base; 713 a crown gear; 714 a pinion gear which is attached to the rotary axis of the motor 715 and comes into engagement with the crown gear; 716 a workpiece; 717 and 718 cross slide tables to move the workpiece 716 along the X and Y axes respectively; 719 a turntable mounted on the cross slide table 717 for exerting the rotational motion to the workpiece 716; and 720, 721 and 722 motors to drive the cross slide tables and turntable respectively.

As the laser generator 702, a gas laser such as a $CO_2$ laser, He-Ne laser or the like, a solid state laser such as a ruby laser, YAG laser or the like, etc. are used. In addition, a power of such a laser beam can be increased by using a Q-switching method or the like as necessary.

The laser beam generated from the laser generator 702 is focused by the lens 707 and is reflected by the reflecting mirror 706 and passes through the bulkhead nozzle 710 and is radiated on the workpiece 716. The position of a focal point is adjusted by moving the focal point adjusting pipe 708 by driving the motor 709. A small hole 706a is formed at the central portion of the reflecting mirror 706. The high-pressure fluid jet such as acid, alkali or the like which is jetted as a thin line form from the high-pressure fluid supplying apparatus passes through the small hole 706a and is jetted onto the workpiece 716 together with the laser beam.

Similarly to the plasma gun 110 in the foregoing embodiment shown in FIG. 1, the Xenon light source 703 is rotated around the optical axis of the laser beam reflected by the reflecting mirror 706 by the rotary mechanism consisting of the rotary disk 711, crown gear 713, pinion gear 714, and motor 715. The Xenon light emitted from the apparatus 703 is radiated to the location which is always precedent from the working laser beam in the direction of the working progressing direction on the surface of the workpiece.

The plasma gas imported from the gas supply tube 705 is discharged toward the working portion through the opening portion 701a at an end of the housing. In this case, the gas for the laser working may be also supplied together with the plasma gas from the plasma gas supply tube 705. The laser working gas may be led into the housing 701 at the upper portion than the bulkhead nozzle 710 and may be discharged through the bulkhead nozzle 710.

In addition, in accordance with a predetermined program, a numerical control unit (not shown) totally controls: the motor 709 to move the focal point adjusting pips 708; the motor 715 to rotate the Xenon light source 703; the motors 720, 721 and 722 to drive the cross slide tables and turntable respectively; quantities of plasma gas and high-pressure fluid to be supplied; etc.

In case of working by the laser machining apparatus shown in this embodiment, the laser beam focused is radiated to the working portion and at the same time the water or fluid of acid, alkali or the like selected in dependence upon the material and the like of the workpiece is discharged as a jet from the high-pressure fluid supplying apparatus 704 at a high pressure toward the working portion. Also, the plasma gas is simultaneously supplied to the periphery thereof. Further, the Xenon light from the apparatus 703 is radiated to the portion which is slightly precedent from the radiating position of the laser beam.

Therefore, the plasma gas supplied to the working portion is most efficiently preheated by the focused laser beam. Further, under the action of a pressure of water discharged at a high pressure from the high-pressure fluid supplying apparatus 704, the working to the portion to be worked is carried out. Additionally, the molecules of water supplied to the working portion are ionized by the laser beam. Since this ionized situation is very unstable, the ionized water molecules are recombined tending to instantly return to their original state. Upon the recombination of the ionized water, a high energy is emitted.

Consequently, the workpiece 716 is extremely efficiently worked under the actions of the pressure of water which is discharged at a high pressure together with plasma gas and of the heat generated when the water molecules are ionized and recombined, as well as the actions of laser beam and Xenon light.

Namely, for example, in the case where a $CO_2$ laser of 200 W is used and the working is performed while supplying water at a rate of 0.05 cc/min, a roughness of the worked surface of 10 μRmax and a working speed of 0.23 g/min could be obtained. On the other hand, in case of performing the working using a conventional general laser machining apparatus, the roughness was 12 μRmax and the working speed was 0.06 g/min.

Water is ordinarily used as a fluid which is supplied from the high-pressure fluid supplying apparatus 704, but an acid fluid is used in the case where material of the workpiece 716 is ceramics, alumina, glass, or the like. Further, in the case of working metal, metal having an oxidized surface, titanium dioxide, or material partially oxidized, etc., it is desirable to use an alkali fluid.

When the path of the high-pressure fluid jet which is discharged from the fluid supplying apparatus 704 coincides with the optical axis of the laser beam and the path is long, the fluid is heated by the laser beam, so that more than a part thereof is evaporated or the jet causes the laser beam to be diffused. In such a case, it is preferable to adopt a constitution such that the Xenon light radiating apparatus 703 and high-pressure fluid supplying apparatus 704 are attached so that their locations are exchanged in FIG. 7. In this case, a radiating diaphragm diameter of Xenon light having the same axis as the laser beam may be set to be larger than that of laser beam, while the beating point of the high-pressure fluid jet against the workpiece may be adjusted and set into the radiating location of the laser beam or into the portion already worked where it is slightly delayed in the working progressing direction.

Next, with reference to FIG. 8, an embodiment will be explained whereby a gas discharged from the working laser generator is used as a part of plasma gas for generation of a plasma jet as an auxiliary energy.

In case of using a gas laser for the laser generator, $CO_2$ laser, He-Ne laser, Ar laser, etc. are known as a gas laser. For example, in case of the $CO_2$ laser, a mixed gas containing $CO_2$, Ne, He, $N_2$, etc. is sealingly enclosed in the laser tube and is allowed to flow therethrough and a gas discharge is generated, thereby causing a laser beam to be oscillated.

At this time, if the temperature of the laser gas exceeds a predetermined value (e.g., 200° C.), the laser beam will not efficiently oscillate. Therefore, the laser gas is allowed to flow through the laser tube at a high speed and it is cooled by being circulated by a gas supplying apparatus, and at the same time a part thereof is discharged and a new gas is supplied continuously.

On the other hand, the plasma generating apparatus generates an arc discharge by application of a voltage between the electrodes from a power supply unit and supplies the plasma gas to the portion around the arc discharge, thereby generating a plasma. In ordinary plasma working, the rate of the cost of gas to the running cost reaches more than 80%.

In a conventional well-known system which works using both a laser generator and a plasma generating apparatus, the laser gas and plasma gas are supplied from individual sources and the discharged gas from the laser generator is drained to the outside. In addition, a large amount of plasma gas is consumed and it is also necessary to supply a working gas, shielding gas, etc. Thus, the cost of gas occupies almost of the running cost and therefore it is very uneconomical.

Figure 8:
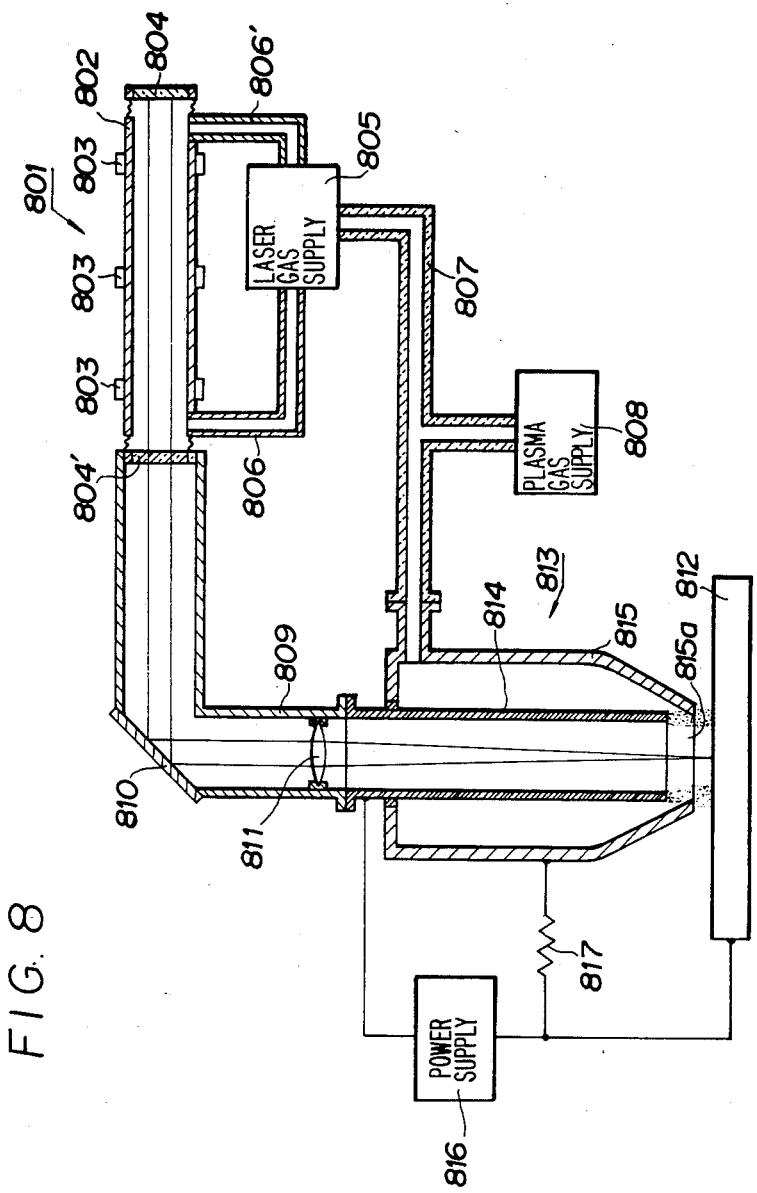
FIG. 8 is a diagram showing one embodiment in which an exhaust gas from the working laser generator is used as a part of a plasma gas to generate a plasma as auxiliary energy.

Therefore, in one embodiment of the laser machining apparatus according to the present invention shown in FIG. 8, the discharged gas from the laser generator is used as a part of plasma gas of the plasma generating apparatus, thereby eliminating the waste gas and omitting or simplifying the cooling apparatus for the laser gas.

In FIG. 8, numeral 801 denotes a laser generator; 802 is a laser tube; 803 discharge electrodes; 804 and 804', reflecting mirrors arranged on both ends of the laser generator 801; 805 a laser gas supplying apparatus; 806 and 806' laser gas supply tubes; 807 a gas transmitting tube for introducing the discharged gas from the laser generator 801 to a plasma generating apparatus; 808 a plasma gas supplying apparatus; 809 a housing; 810 a laser beam reflecting mirror; 811 a focusing lens; 812 a workpiece; 813 the plasma generating apparatus; 814 one electrode for generating a plasma; 815 a plasma torch nozzle; 815a an opening at the end of the nozzle 815; 816 a power supply unit for generating a plasma; and 817 a resistor inserted. A cooling water jacket provided around the peripheral of the laser tube 802, or a cross slide table and a turntable and the like to move the workpiece 812 are omitted in the diagram.

The discharge electrodes 803 cause the laser gas in the laser tube 802 to generate the discharge and excite the laser gas molecules, thereby generating a laser beam.

The reflecting mirror 804 totally reflects the laser beam generated in the laser tube 802, while the reflecting mirror 804' is semitransparent and transmits a part of the laser beam.

Thus, the laser beam generated due to discharge in the laser tube 802 successively causes the induced radiation and resonates between the reflecting mirrors 804 and 804' to increase its strength, so that it passes through the reflecting mirror 804' and is sent as a beam.

The laser gas supplying apparatus 805 sends a laser gas into the laser tube 802 through the laser gas supply tube 806; allows the gas to flow in the laser tube 802 at a high speed; then collects it from the other laser gas supply tube 806'; and cools it; then circulates it continuously.

At this time, the laser gas supplying apparatus 805 sends about, e.g., two-fifths of the collected laser gas to the gas supply tube 807 as exhausted gas and circulates the remaining gas of about three-fifths. On the other hand, the lack of gas due to the exhausting is newly supplemented by the laser gas supplying apparatus 805.

Since the composition of the laser gas is different from that of the plasma gas and a quantity of discharged gas from the laser generator 801 is less than the quantity of plasma gas to be used in the plasma generating apparatus (according to experiments, the discharged gas from a laser generator of 1.2 kW is about 100 l/h, while the plasma gas necessary for a plasma generating apparatus of 1.5 kW is about 800 l/h), in order to use the discharged gas from the laser generator as the plasma gas, the composition of gas has to be changed and at the same time the lack of gas has to be supplemented.

For reference, an example of the composition of a laser gas and a plasma gas as a volume ratio is as follows;

Laser gas $Ar:He:CO_2:N_2 \approx 0-0.5:9:1:3$

Plasma gas $Ar:He:CO_2:N_2 \approx 0.5-1:3:1:3$

Therefore, the plasma gas supplying apparatus 808 supplements the lack of gas at a proper rate for the discharged gas from the laser generator 801 and adjusts it so that suitable composition and quantity for a plasma gas can be obtained, and thereafter supplies it into the plasma generating apparatus 813.

The reflecting mirror 810 is attached to the housing 809 and reflects the laser beam generated from the laser generator 801, thereby changing its optical path.

The focusing lens 811 focuses the laser beam reflected by the reflecting mirror 810 and collects it onto a working point on the workpiece 812.

The power supply unit 816 applies a sufficient voltage of the order at which the discharge can be developed among the electrode 814 (cathode) of the plasma generating apparatus 813 and the plasma torch nozzle 815 (anode) and the workpiece 812 (anode). In this case, an appropriate potential difference is given by the resistor 817 between the nozzle 815 (anode) and the worlPiece 812 (anode).

The plasma generating apparatus 813 is arranged on the same axis as the optical axis of the laser beam and generates a plasma jet by being supplied with plasma gas from the gas supply tube 807 and a voltage from the power supply unit 816. This plasma is radiated so as to surround the peripheral of the irradiation point of the laser beam.

The laser beam focused by the lens 811 is, therefore, radiated onto the working point of the workpiece 812 and an impact of a high-energy density is applied, so that the portion around the working point is heated by the plasma, thereby allowing the working such as welding, cutting, fusion, etc. to be executed very efficiently.

The workpiece 812 is put on an attaching base of the cross slide table (not shown) connected to a numerical control unit (not shown) and is two-dimensionally moved in response to a command from the numerical control unit. Therefore, a desired contour is cut out of the workpiece 812.

In the laser machining apparatus as shown in FIG. 8, when a laser generator of 1 kW and a plasma generating apparatus of 400 W were used, by adding a gas of about 200 l/h to the discharged gas from the laser generator, it could be used as the plasma gas.

In addition, even if the laser gas is not cooled in particular, the laser oscillation will not be disturbed, so that the cost of the system and its running cost could be reduced.

A quantity of discharged gas from the laser generator 801 increases as the scale of laser generator becomes large. Therefore, the arrangement shown in FIG. 8 is very advantageous for a laser machining apparatus which uses both a large-sized laser generator and a plasma generating apparatus.

Next, another embodiment of the laser machining apparatus according to the present invention will be explained with reference to FIG. 9.

Figure 9:
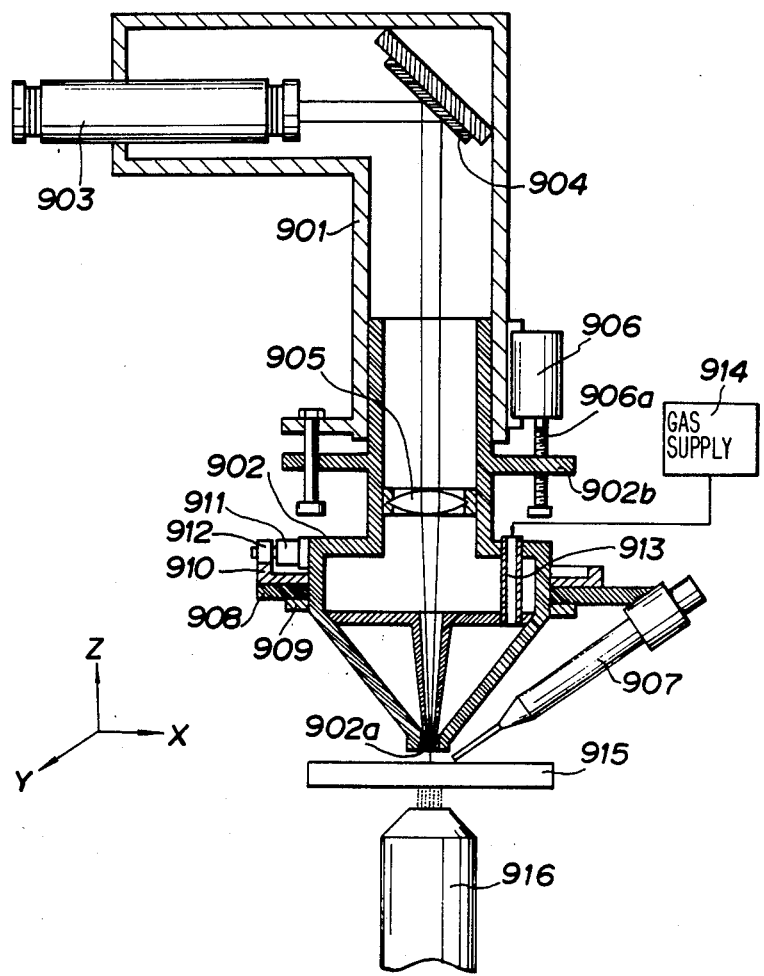
FIG. 9 is a diagram showing one embodiment in which a plasma is used as auxiliary energy and a working fluid is supplied to the working portion, and at the same time 80% or more of the working fluid is evaporated thereby carrying out the working.

The embodiment shown in FIG. 9 is also constituted in the manner such that a plasma jet as auxiliary energy is radiated to a location different from the irradiation point of the laser beam, namely, onto the opposite surface of the workpiece in accordance with the fundamental principle of the present invention. Further, in the embodiment, the working fluid is supplied to the working portion and the working is done while more than 80% of the working fluid is being evaporated.

In a conventional laser machining apparatus, in the case of working quartz glass or the like which is relatively difficult to be worked, the quartz glass is kept in the working fluid and the working is done while radiating the laser beam through the working fluid to the quartz glass. However, unless the laser beam has a proper wavelength, almost all of the laser beam will be absorbed in the working fluid. Even if a wavelength of laser beam is suitable, there is a problem that it takes a long time to work.

In the embodiment shown in FIG. 9, a working fluid such as an acid or alkali fluid or the like is supplied onto the surface of the workpiece and over 80% of the working fluid supplied is evaporated by the laser beam, effecting the working.

In FIG. 9, numerals 901 and 902 denote housings; 902a is an opening at the end of the housing 902; 903 a laser generator; 904 a reflecting mirror; 905 a focusing lens; 906 a motor to move the housing 902 along the housing 901 in the direction of Z axis, thereby to adjust a focal point of the laser beam; 907 a working fluid supplying apparatus; 908 a rotary disk; 909 a rotary disk attaching base; 910 a crown gear; 911 a motor; 912 a pinion gear which is attached to the shaft of the motor 911 and is in engagement with the crown gear 910; 913 a tube for supplying a laser working gas such as halogen or the like; 914 a gas supplying apparatus; 915 a workpiece; and 916 a plasma generating apparatus for radiating a plasma to the workpiece 913 from the side opposite to the working laser beam.

A cross slide table and a turntable to move the workpiece 915 are omitted.

The laser beam generated from the laser generator 903 is reflected by the reflecting mirror 904 and its optical path is changed, thereafter it is focused by the lens 905 and is radiated onto the working point on the workpiece 915. At this time, a halogen gas, furon gases of various kinds, oxygen, or mixtures of these gases which were supplied from the working gas supplying apparatus 914 are simultaneously discharged from the opening 902a of the housing 902 toward the working portion onto which the laser beam has been radiated. Further, a plasma jet is radiated from the plasma generating apparatus 916 onto the opposite surface of the workpiece 915, so that the workpiece is sufficiently heated and is efficiently worked.

A working fluid which is selected in accordance with the material of the workpiece 915 and working conditions, for instance, an acid or alkali working fluid such as HCl, dilute $H_2SO_4$, KOH aqueous solution, HF aqueous solution, hydrocarbon, etc. is supplied from the working fluid supplying apparatus 907 to the radiating portion of the laser beam. This working fluid is supplied by a predetermined limited quantity as a thin jet fluid stream or mist droplets, or further as a spray mist with a gas such as an inert gas or the like. The working fluid supplying apparatus 907 is rotated by the rotating mechanism consisting of the rotary disk 908, crown gear 910, pinion gear 912, and motor 911 around the optical axis of the laser beam reflected by the reflecting mirror 904 is rotated in similar manner as the plasma gun 110 in the embodiment shown in FIG. 1. The working fluid discharged from the apparatus 907 is supplied to the location which preferably precedes the working laser beam on the surface of the workpiece in the working progressing direction.

In accordance with a predetermined program, a numerical control unit (not shown) totally controls: the motor 906 to move the housing 902 in the direction of the Z axis in the diagram; the motor 911 to rotate the rotary disk 908; motors (not shown) to drive the cross slide table and turntable for moving the workpiece 915; the supply location and supply quantity of the working fluid from the working fluid supplying apparatus 907; a supply quantity of the gas by the working gas supplying apparatus 914; and the like.

In the case of working by the laser machining apparatus of the present invention with such an arrangement as mentioned above, the working fluid supplied to the working portion of the workpiece 915 is heated by the working laser beam and plasma heat from the plasma generating apparatus 916 and the working is done while more than about 80% of the working fluid is evaporated. Therefore, the working is extremely efficiently performed without the laser beam being absorbed by the working fluid. Further, since a halogen gas, furon gases of various kinds, oxygen etc., or mixtures of them, which may be selectively chosen in accordance with the material of the workpiece, are supplied as the working gas through the opening 902a of the housing 902, material such as quartz glass or the like which is difficult to be worked by an ordinary laser working can be also easily worked.

Namely, for example, quartz glass having an outer diameter of 38 mm and an inner diameter of 4 mm was worked at a working feeding speed of 35 mm/min by use of a $CO_2$ laser of 100 W while supplying an aqueous solution of HF as a working fluid at a rate of 0.02 cc/min. As a result, the above quartz glass could be cut at a rate of 162 mm/min. On the contrary, when a similar quartz glass was worked using a conventional laser machining apparatus, it took several times longer than that by the systsm of the present invention.

As described above, according to the laser machining apparatus of the embodiment shown in FIG. 9, even quartz glass or the like which is difficult to be worked in particular can be worked within a short time irrespective of the material of a workpiece, etc.

Next, an embodiment will be explained with reference to FIG. 10 whereby a plasma is used as auxiliary energy and the plasma is radiated to the location which is preceding the working laser beam for the workpiece in accordance with the fundamental principle of the present invention, and a working fluid to which an ultrasonic energy was applied is supplied to the working portion or to the portion immediately after working.

In case of laser machining, in the order to remove working debris from the working portion or to prevent deterioration of working accuracy because of change in quality of workpiece due to the heat of the laser, a working fluid is ordinarily supplied to the working portion. However, quick removal of working debris and sufficient cooling effect of the working portion are not always obtained by merely supplying the working fluid by ordinary means. To solve this problem, in the embodiment shown in FIG. 10, a working fluid to which ultrasonic energy was applied is supplied to the working portion or a portion immediately after working, thereby effectively removing the working debris and improving the cooling effect and thereby enabling the working to be smoothly performed with a high degree of accuracy.

Figure 10:
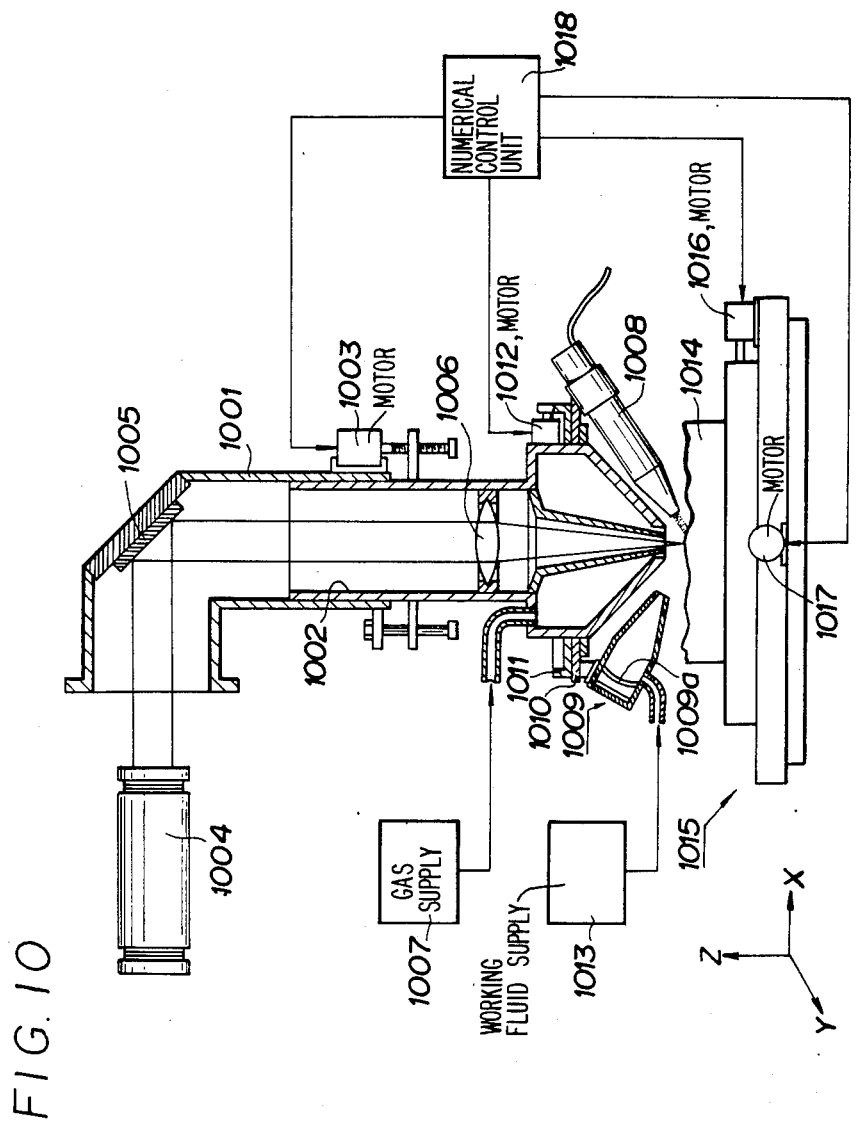
FIG. 10 is a diagram showing one embodiment in which a plasma is used as auxiliary energy and the plasma is radiated onto the position of a workpiece which is precedent from the position where the working laser beam is radiated, and at the same time a working fluid to which the ultrasonic energy was applied is supplied to the working portion or the portion immediately after completion of the working, thereby carrying out the working.

In FIG. 10, numeral 1001 denotes a housing; 1002 is a vertically slidable housing attached to the lousing 1001; 1003 is a motor to adjust a focal point by vertically moving the housing 1002 with respect to the housing 1001; 1004 a laser generator; 1005 a reflecting mirror; 1006 a focusing lens; 1007 a working gas supplying apparatus; 1008 a plasma generating apparatus; 1009 a working fluid supplying nozzle; 1009a an ultrasonic vibrator attached to the working fluid supplying nozzle; 1010 a rotary disk to which the plasma generating apparatus 1008 and working fluid supplying nozzle 1009 are respectively attached to the opposite sides on a diameter thereof; 1011 a crown gear fixed to the rotary disk 1010; 1012 a motor to rotate the crown gear 1011; 1013 a working fluid supply tank; 1014 a workpiece; 1015 a cross slide table to move the workpiece; 1016 and 1017 motors to drive the cross slide table; and 1018 a numerical control unit.

The laser beam generated by the laser generator 1004 is reflected by the reflecting mirror 1005 and is focused by the lens 1006 and is radiated onto the workpiece 1014. At this time, a working gas from the working gas supplying apparatus 1007 is discharged toward the working portion.

Also, the plasma generating apparatus 1008 is rotated by the rotating mechanism consisting of the rotary disk 1010, crown gear 1011, motor 1012, etc. around the optical axis of the laser beam reflected by the reflecting mirror 1005 in the similar manner as the plasma gun 110 in the embodiment shown in FIG. 1 is rotated. A plasma generated by the apparatus 1008 is radiated to the location which precedes the working laser beam on the surface of the workpiece in the working progressing direction.

On the other hand, the working fluid introduced from the working fluid supply tank 1013 to the working fluid supplying nozzle 1009 is jetted to the surface of the workpiece. In this case, since the working fluid supplying nozzle 1009 is attached to the side opposite to the plasma generating apparatus 1008 on the diameter of the rotary disk 1010, when the rotary disk 1010 is rotated such that the plasma is radiated to the location which precedes the laser radiating portion, the working fluid from the supplying nozzle 1009 is discharged toward the portion immediately after working by the laser beam.

The working fluid of a predetermined flow rate is fed into the working fluid supplying nozzle 1009 from the working fluid supply tank 1013 and is discharged through the opening end of the nozzle after addition of an ultrasonic vibrational energy by the vibrator 1009a. The ultrasonic vibrator 1009a performs the ultrasonic vibration due to a current from a high-frequency power source (not shown). When a vibration of relatively high frequency is required, an electrostrictive vibrator is preferably used for the vibrator 1009a, while a magnetostrictive vibrator may be used when a relatively low frequency is to be generated. Only one vibrator 1009a may be provided as shown in the embodiment, but it is also possible to provide a plurality of such vibrators and to apply a plurality of ultrasonic vibrational energies having different frequencies to the working fluid.

In accordance with a predetermined program, the numerical control unit 1018 controls: the motor 1003 to adjust the focal point of the laser beam by moving the housing 1002 in the direction of the Z axis in the diagram; the motor 1012 to rotate the plasma generating apparatus 1008 and working fluid supplying nozzle 1009 around the optical axis of the laser beam; the motors 1016 and 1017 to drive the cross slide table 1015, etc.

In the case of working by the laser machining apparatus of the present invention with such an arrangement as mentioned above, the laser beam generated by the laser generator 1004 is radiated onto the working portion of the workpiece 1014, and a working gas is discharged thereto, and at the same time a plasma jet from the plasma generating apparatus 1008 is radiated to the location which precedes the radiating portion of the laser beam. At this time, a surplus of the working fluid near the working point is removed due to the evaporation of the working fluid by discharging the working gas and by radiating the laser beam and plasma, so that the working portion is covered by a layer of the working fluid of a proper amount and the laser beam is radiated through the layer. Thus, the working is very efficiently performed. At the same time, the portion immediately after working is cooled by the working fluid to which ultrasonic vibrational energy was applied and deformation due to the heat is prevented, so that only a desired portion is accurately worked. In addition, the working debris is effectively removed and the energy of the laser beam is supplied only to the working point, thereby allowing a working efficiency to be improved.

Particularly, the working fluid to which an ultrasonic vibrational energy is applied has a high cooling effect and can present a cooling effect which is two or more times that in the case of an ordinary working fluid. Also, when two or more kinds of ultrasonic vibrational energies having different frequencies were applied to the working fluid, it is possible to obtain a cooling effect which is three or more times that in the case of an ordinary working fluid.

Furthermore, the working fluid to which an ultrasonic vibrational energy was applied is extremely effective to remove the working chips because a physical peeling force due to cavitation is applied in addition to the boiling phenomenon caused by the laser beam. Particularly, in the case of three-dimensional working, it is effective to remove the working chips from blind holes or narrow gap portions. In addition, the working chips can be removed within a short time as compared with the case where an ordinary working fluid is supplied.

In the case where a surface-active agent or the like is mixed with the working fluid and it is discharged from the working fluid supplying nozzle 1009 in the form of a foam, the working chips can be further effectively removed with the aid of cleaning action due to the emulsifying action as well. In this case, the working fluid which once became foam is broken due to radiation of the laser beam at the working portion, so that no additional working fluid remains in the working portion, but the working portion is covered by the working fluid layer of a proper amount, and thus the portion immediately after working is cooled by the working fluid with the ultrasonic vibrational energy.

In experiments using an laser machining apparatus according to the present invention as shown in FIG. 10, when a laser generator having a power of 100 W was used and an ultrasonic vibrational energy of 500 kHz and 20 W was applied to the working fluid, the working could be done with a working surface roughness of 5 $\mu$Rmax and at a working speed of 0.08 g/min.

Next, an embodiment will be explained with reference to FIG. 11 whereby a plasma is used as an auxiliary energy and the location of a focal point of the laser beam is automatically controlled by sensing infrared rays generated from the working portion.

In the case of performing the laser working, since the energy density of the laser beam becomes maximum at the location of a focal point of the laser beam, it is desirable to allow the focal point location to coincide with the working surface. Therefore, in a conventional laser machining apparatus, to allow a convergent point of the laser beam focused by a focusing lens to coincide with the working surface or working point of the workpiece, the working surface of the workpiece is magnified by a microscope which uses the focusing lens for the laser beam in common and is directly observed, or a sighting apparatus for observing an image from the microscope through a television monitor is provided and an operator operates and moves the focusing lens system so as to focus the focal point of the image.

Consequently, in a conventional laser machining apparatus, when performing various workings, the operator has to observe the sighting apparatus and to operate the apparatus for moving the focusing lens system at the start of working or during the working, whereby the efficiency is poor and a working accuracy is low.

With respect to an automatic controlling method to move the working laser beam in the direction perpendicular to its optical axis, i.e., along the working surface, the automatic control can be accurately performed by controlling a cross slide table for moving a workpiece or an apparatus for moving the focusing lens system for the laser beam by use of a numerical control unit or the like. This results in an extreme improvement in working accuracy. However, the control of movement in the direction of the optical axis of the laser beam, i.e., in the direction perpendicular to the workpiece depends on the observation and operation by the operator. This obstructs the promotion of automation and lavor-saving for the laser machining apparatus and also obstructs the improvement in working accuracy.

Further, for example, in a boring operation since the working portion moves in association with the progress for working and is shifted from the focal point of the laser beam, the working progresses at a relatively high speed until a certain depth, but the speed thereafter becomes slow and the working hardly progresses thereafter.

Due to this, in a conventional laser machining apparatus, the lens system is controlled so as to be moved in the direction of the optical axis of the laser beam, or the cross slide table or the like onto which a workpiece is attached is controlled so as to be moved in the direction of the optical axis, thereby adjusting the location of the focal point of the laser beam.

However, as mentioned above, the working portion is moved in the direction of the optical axis as the working advances during the boring working. Also, even during cutting, welding, quenching, etc., the working surface of the workpiece is not always a flat plane perpendicular to the optical axis of the laser beam and the location of the working portion changes in the direction of the optical axis as the workpiece is advanced; therefore, it is very difficult to move and control the focal point location so as to be coincident with the working portion. Thus, the well-known laser machining apparatus has problems in working speed, efficiency and finishing accuracy.

Figure 11:
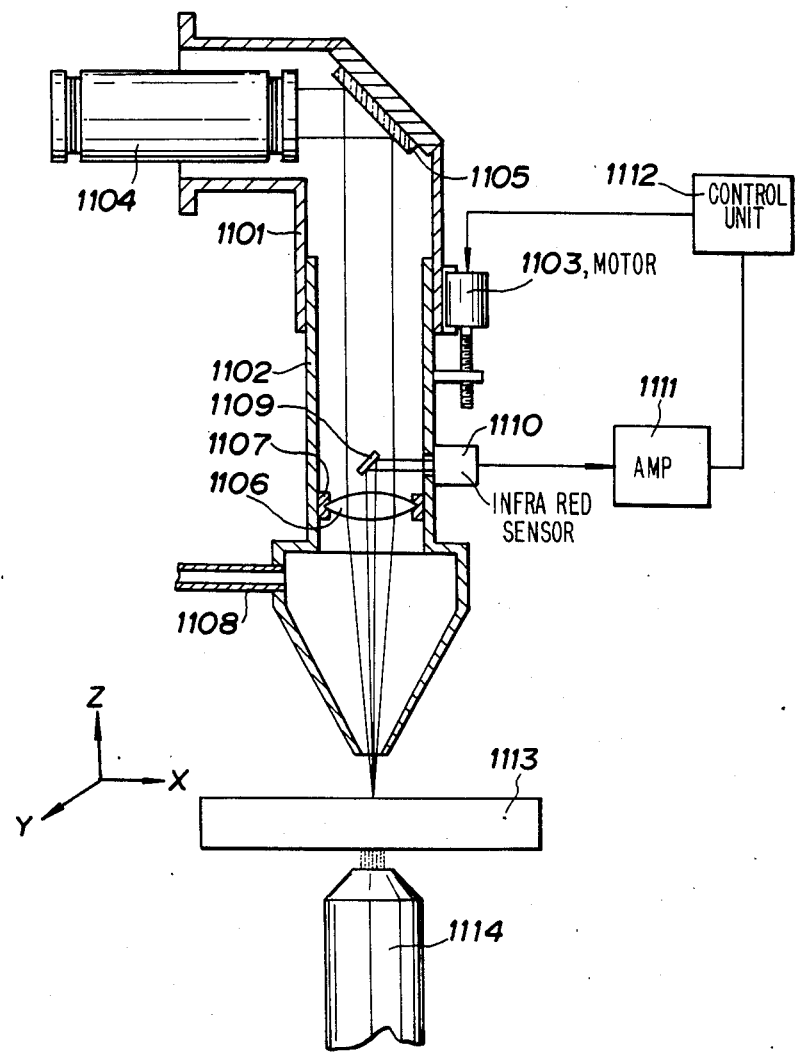
FIG. 11 is a diagram showing one embodiment in which a plasma is used as auxiliary energy and infrared rays from the working portion is sensed, thereby automatically controlling the position of the focal point of the laser beam.

To solve such problems, in the embodiment shown in FIG. 11, the location of the focal point of the lens system is automatically controlled such that the maximum amount of infrared rays is always sensed from the working point.

In FIG. 11, numeral 1101 denotes a housing; 1102 is a vertically slidable housing attached to the housing 1101; 1103 a motor to vertically move the housing 1102 with respect to the housing 1101; 1104 a laser generator; 1105 a reflecting mirror; 1106 a focusing lens; 1107 a lens fixing member; 1108 a working gas supply tube; 1109 a reflecting mirror to fetch an infrared radiation generated from the working portion; 1110 an infrared sensor;

1111 an amplifier; 1112 a control unit to control the motor 1103 in response to a signal from the amplifier; 1113 a workpiece; and 1114 a plasma generating apparatus. A cross slide table and the like to move the workpiece 1113 is omitted.

In the embodiment, the execution of boring will be described but other operations such as cutting, welding, quenching, etc. can be also performed by a system similar to this.

The laser beam generated from the laser generator 1104 is reflected by the reflecting mirror 1105 and is focused by the lens 1106 and is radiated onto the workpiece 1113. In the boring working, it is advantageous to increase the energy of the laser beam per unit hour so that a radiation energy is effectively utilized for the working in the manner such that thermal losses due to thermal conduction is made as small as possible and the influence of working does not affect surrounding portions. Therefore, a pulse oscillation laser or a laser which was pulsated by intermittently light-shielding a continuous oscillation laser is generally used.

A working gas introduced from the working gas supply tube 1108 is discharged toward the working point through the opening at the end of the housing 1102. The fixing member 1107 to fix the focusing lens 1106 to the housing 1102 hermetically seals the gap between the lens 1106 and the housing 1102, thereby preventing the working gas from intruding into the portion thereover.

A plasma jet from the plasma generating apparatus 1114 is radiated as auxiliary energy onto the opposite surface of the workpiece 1113 for improvement in efficiency of the boring operation by the laser beam.

The focusing lens 1106 focuses the laser beam reflected by the reflecting mirror 1105 and converges it onto the working point of the workpiece 1113, and at the same time it serves to collect infrared rays generated from the working point and to send them to the reflecting mirror 1109.

The housing 1102 is vertically moved along the housing 1101 in accordance with the rotation of the motor 1103 and the focusing lens 1106 is also moved together therewith, thereby adjusting a focal point.

When the laser beam focused is irradiated onto the working surface of the workpiece 1113, the irradiated portion absorbs the energy of the laser beam and is heated to a high temperature, so that it is instantly fused or evaporated and is worked. At this time, infrared rays are generated from the working portion which was heated to a high temperature and the infrared energy is substantially proportional to the temperature of the working portion.

The infrared rays from the working portion are generated almost radially and are collected by the lens 1106 and reflected by the reflecting mirror 1109, then they are sensed by the infrared sensor 1110.

The infrared reflecting mirror 1109 is disposed over the focusing lens 1106 on an optical axis of the laser beam. Due to this, even when the working portion is moved into the deep portion of the hole during boring the infrared rays generated therefrom can be sensed.

The infrared sensor 1110 is attached to the outer surface of the housing 1102 and is moved integrally with the housing 1102.

The infrared sensor 1110 includes an element such as HgCdTe, PbS, PbSe, InSb, PbSnTe, etc., or an element of PtSi, Ge, Hg, Au, Ga, In, etc. as a type of photo conductivity type MOSs. Such a sensor senses the amount of infrared rays reflected by the reflecting mirror 1109 and produces a signal responsive to its amount.

The amplifier 1111 amplifies the signal from the infrared sensor 1109 and sends it to the control unit 1112.

When the signal from the amplifier 1111 is sent to the control unit 1112, the control unit gives a command to the motor 1103 in accordance with a predetermined program to make it operative, thereby allowing the housing 1102 to be moved to the location where the output from the infrared sensor 1110 becomes maximum.

The infrared radiation generated from the working portion becomes maximum when the working surface is heated to a high temperature and the maximum working efficiency is obtained. Therefore, by constituting the control unit 1112 so as to control the focal point location such that the maximum infrared energy is always detected, the focal point of the laser beam is always allowed to substantially coincide with the location of the working point of the workpiece. Thus, even when the working point is moved into the inner part of the workpiece, maximum working efficiency can be obtained.

The workpiece 1113 is attached onto an attaching base of the cross slide table and is two-dimensionally moved in the direction of X and Y axes in the diagram in response to commands from a control unit (not shown) such as an numerical control unit or the like. Thus, the boring location can be freely set and a plurality of boring workings can be continuously performed.

Generally, in boring by a laser beam, when the location of a focal point of the laser beam is largely shifted on its optical axis from the point to be worked, its energy density becomes small, so that the working cannot be performed. However, the working can be carried out even when the location of the working point is deviates from the location of the focal point by about 1 mm.

However, the shapes of bored holes fairly differ in dependence upon the positional relation between the working surface and the focal point. When the focal point is at the outside of the working surface, the hole becomes conical. On the other hand, when the focal point is at the inside of the working surface, the hole assumes the shape of the central portion. In the case where the working surface and the focal point coincide, the hole has an almost uniform diameter and the working efficiency becomes maximum.

Therefore, in the laser machining apparatus having the function of automatic adjustment for the focal point as shown in FIG. 11, during the boring the lens system is moved and controlled such that the maximum amount of infrared rays from the working point is always sensed and the focal point of the laser beam always coincides with the working point of the workpiece. Therefore, the maximum working efficiency is obtained and even when there is a variation in working depth, the working can be progressive and a hole having an almost uniform diameter can be bored.

Next, with reference to FIGS. 12 and 13, an embodiment will be explained whereby a plasma jet is used as auxiliary energy and the location of a focal point of a laser beam is automatically adjusted using a light source for sighting.

Figure 12:
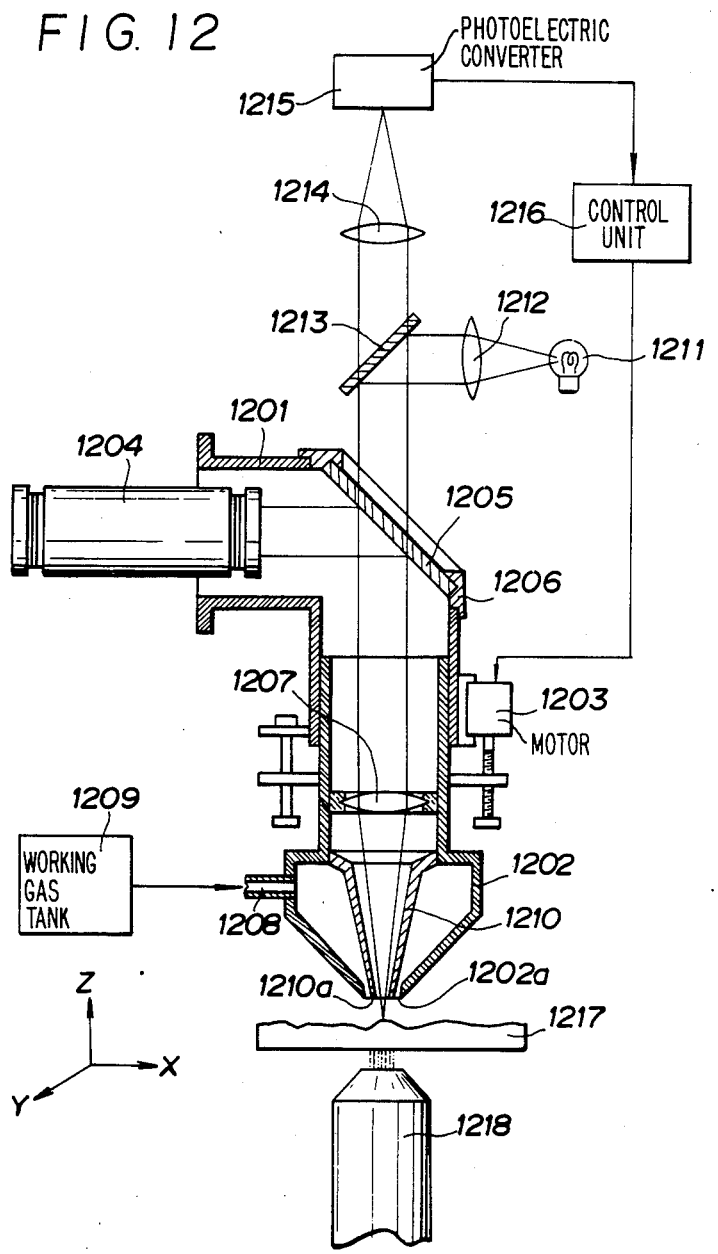
FIG. 12 is a diagram showing one embodiment in which a plasma is used as auxiliary energy and a light source for sighting is also equipped, thereby automatically controlling the position of the focal point of the laser beam.
Figure 13:
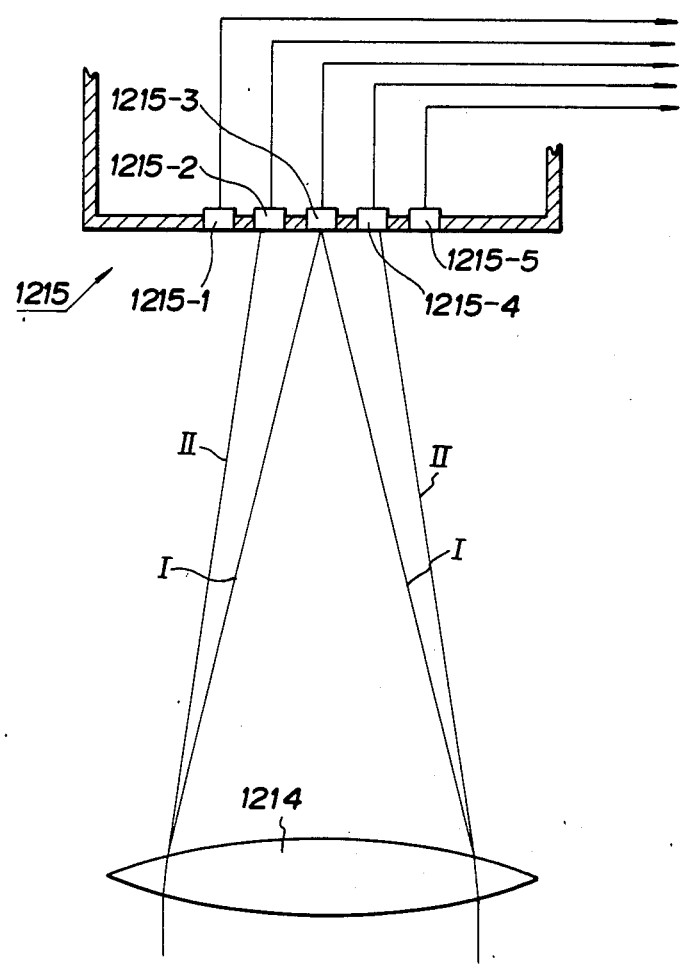
FIG. 13 is a diagram showing the details of a photoelectric converter which is provided in the apparatus shown in FIG. 12.

In FIGS. 12 and 13, numeral 1201 denotes a housing; 1202 indicates a housing attached to the housing 1201 so as to be slidable in the direction of the Z axis in the diagram; 1203 is a motor to move the housing 1202 in the direction of Z axis with respect to the housing 1201;

1204 a laser generator; 1205 a selective transmitting mirror; 1206 a window to attach the selective transmitting mirror; 1207 a focusing lens; 1208 a working gas supply tube; 1209 a working gas tank; 1210 a bulkhead nozzle; 1211 a light source for sighting; 1212 a first sighting lens; 1213 a semi-transparent mirror (half mirror); 1214 a second sighting lens; 1215 a photoelectric converter; 1215-1 to 1215-5 photo sensing elements; 1216 a control unit; 1217 a workpiece; and 1218 a plasma generating apparatus. A cross slide table or the like to move the workpiece 1217 is omitted.

The selective transmitting mirror 1205 is attached to the fixing window 1206 fixed to the housing 1201 so as to form an angle of 45° against an optical axis of a laser beam generated from the laser generator 1204. The mirror 1205 perpendicularly changes the light path of the laser beam and also transmits the sighting light which was emitted from the sighting light source 1211 and reflected by the semi-transparent mirror 1213, then it sends the light toward the workpiece 1217.

In another embodiment of the selective transmitting mirror 1205, the mirror may be constituted in the manner such that a micro hole is formed in a total reflecting mirror and thereby the light from the sighting light source 1211 is transmitted through this hole.

The focusing lens 1207 attached to the housing 1202 focuses both the light from the sighting light source 1211 transmitted through the selective transmitting mirror 1205 and the laser beam reflected by the selective transmitting mirror 1205 to the same point and converges them onto the working point on the workpiece 1217. The lens 1207 further receives the light for sighting which is reflected by the working surface of the workpiece 1217 and returned therefrom.

The housing 1202 is attached to the housing 1201 so as to be slidable in the direction of the Z axis. The housing 1202 is moved along the Z-axis by rotating the motor 1203, thereby adjusting the focal point of the lens 1207.

The funnel bulkhead nozzle 1210 is provided in the enlarged portion at an end of the housing 1202 and separates the portion into a radiation port 1210a for the laser beam and a working gas exhausting nozzle 1202a which is coaxial therewith.

In accordance with the material of the workpiece 1217, a working gas such as oxygen an inert gas, carbon dioxide etc. is supplied from the working gas tank 1209 through the gas supply tube 1208 into a spaced portion between the housing 1202 and the bulkhead nozzle 1210. The gas is then discharged from the gas exhaust nozzle 1202a to the irradiation point of the laser beam.

The sighting light source 1211 is disposed at the focal point of the first sighting lens 1212, so that the light transmitted therethrough becomes parallel light and is radiated onto the half mirror 1213. Although a light source which emits an ordinary incandescent light has been shown as the sighting light source 1211 in the embodiment, in place of this, a laser generator may be used which generates a laser beam having a wavelength different from that of the laser beam for working. In both cases as well, as the selective transmitting mirror 1205, there is used a mirror of the type having characteristics such that the laser beam generated from the laser generator 1204 is reflected and the sighting light is transmitted due to the difference in wavelength of the laser beams. On the other hand, as the focusing lens 1207, there is used a lens of the type which focuses the laser beam from the laser generator 1204 and the sighting light to the same point so that convergent points of them are not changed due to the difference in wavelength.

The semi-transparent mirror 1213 is disposed on an extended line of the optical axis of the laser beam which is sent toward the workpiece by being reflected by the selective transmitting mirror 1205. Its attaching angle is set such that when the sighting light which was made parallel by the first sighting lens 1212 is reflected by this mirror 1213, the optical axis of the reflected light coincides with the optical axis of the laser beam.

The semi-transparent mirror 1213 transmits the light which was reflected by the working surface cf the workpiece 1217 and returned through the focusing lens 1207 and selective transmitting mirror 1205, and sends the light to the second sighting lens 1214.

Although, in this embodiment, the second sighting lens 1214 is disposed on an extending line of the optical axis of the laser beam and the sighting light source 1211 and the first sighting lens 1212 are arranged in the direction perpendicular thereto, the positional relation between them may be conversely arranged.

By arranging the optical system as described above, the optical axis of the parallel sighting light reflected by the half mirror 1213 is made coincident with the optical axis of the laser beam reflected by the selective transmitting mirror 1205, then the sighting light is focused by the focusing lens 1207 and is radiated onto the workpiece 1217. In this case, even if the wavelengths of the laser beam and the sighting light differ, the convergent points of those lights can be made coincident by appropriately selecting the material of the focusing lens 1207.

The second sighting lens 1214 is also disposed on an extending line of the optical axis of the laser beam which is reflected by the selective transmitting mirror 1205. and progresses toward the workpiece. The lens 1214 focuses the sighting light which had been reflected by the workpiece 1217 and was collected by the focusing lens 1207 and is returned by passing through the selective transmitting mirror 1205, then it radiates the light onto the photoelectric converter 1215.

Although not shown, a protective filter may be also provided between the second sighting lens 1214 and the photoelectric converter 1215.

The photoelectric converter 1215 is disposed at the the focal point of the second sighting lens 1214 so that the distance between this lens and the converter 1215 is fixed. The details of the photoelectric converter 1215 are as shown in FIG. 13. Namely, the photo sensing elements 1215-1 to 1215-5 such as photo transistors or the like are arranged in the focal plane of the second sighting lens 1214. Such elements can sense the sighting light which is reflected by the workpiece and passes through the selective transmitting mirror 1205 and semi-transparent mirror 1213 and is focused by the second lens 1214.

The photo sensing element 1215-3 is arranged at the central location of the focal point of the second sighting lens 1214. The photo sensing elements 1215-1 and 1215-2 and the elements 1215-4 and 1215-5 are arranged at the locations which are symmetrical around the central photo sensing element 1215-3 and on the same plane as the photo sensing element 1215-3.

Although, in this embodiment, there are five photo sensing elements 1215-1 to 1215-5, the number of the elements can be freely changed in accordance with the kinds of sighting lights or with an aperture, the focal distance or the like of the second sighting lens 1214.

Also, a plurality of such elements may be concentrically arranged around the central photo sensing elements 1215-3.

The signals from the respective photo sensing elements of the photoelectric converter 1215 are interpreted and operated by the control unit 1216. The motor 1203 to move the housing 1202 along the Z-axis is controlled in response to an output signal from the control unit 1216 in the manner as described below.

Namely, when a convergent point of the laser beam by the focusing lens 1207 coincides with the working plane of the workpiece 1217, a convergent point of the sighting light also coincides with the working plane of the workpiece 1217 and both the laser beam and the sighting light beam focused at one point on the working plane.

The sighting light beam reflected by the working surface of the workpiece 1217 is returned along the same light path as the transmission path from the semitransparent mirror 1213 to the workpiece 1217. When this sighting light beam returned is focused by the second sighting lens 1214, it is focused along the light paths indicated at I and I in FIG. 13 and is converged at the focal point of the second sighting lens 1214.

Since the photo sensing element 1215-3 of the photoelectric converter 1215 is disposed at the focal point of the second sighting lens 1214, the sighting light beam collected at the focal point is sensed only by the photo sensing element 1215-3, so that a strong signal is produced only from the photo sensing element 1215-3 among the five photo sensing elements.

In this case, the control unit 1216 holds the motor 1203 in the stopped state, thereby maintaining the housing 1202 at a constant location.

Next, when a convergent point of the sighting light beam does not coincide with the working surface of the workpiece, two cases are considered: (a) where the convergent point of the sighting light beam is located inside of the workpiece 1217; and (b) where it is located outside of the workpiece 1217.

In both cases, since the convergent points of the sighting light beam are not on the working surface, the light is radiated in a certain extended range around the working point as a center on the working surface and the light is reflected from this whole portion. Thus, the reflected light is not focused to one point by the second sighting lens 1214, causing a light spot having an extent of a certain range to be produced in the focal plane of the second sighting lens 1214. For example, it is focused along the light paths indicated at II and II in FIG. 13 and the light is sensed by the photo sensing elements 1215-2, 1215-3 and 1215-4. At this time, the signal level from the photo sensing element 1215-3 largely decreases as composed to the case where the focal point was correctly adjusted.

When the convergent point of the laser beam substantially deviates from the working surface of the workpiece, the sighting light reflected is sensed by all of the photo sensing elements 1215-1 to 1215-5.

Discrimination between the above-mentioned cases (a) and (b) and coincidence of the convergent point of the laser beam with the working surface of the workpiece are performed by a method which will be explained below.

Firstly, for example, the motor 1203 is slightly rotated and the housing 1202 is allowed to slightly approach the workpiece.

In the case of (a) mentioned above, the light spot formed on the working surface further enlarges and the light spot in the focal plane of the second sighting lens 1214 also further enlarges, so that the intensity of light which is sensed by the photo sensing elements 1215-2, 1215-3 and 1215-4 is reduced.

In such a case, the motor 1203 is immediately reversely rotated to move the housing 1202 away from the workpiece by a very small distance, such that only the photo sensing element 1215-3 receives the light.

Contrarily, in the case of (b), by allowing the housing 1202 to slightly approach toward the workpiece, the light spot on the working surface is reduced and the light path of the sighting light reflected approaches the light paths I and I, causing the intensity of light which is sensed by the photo sensing element 1215-3 to be increased, so that the intensity of the signal transmitted therefrom also increases.

In such a case, the motor 1303 is further rotated in the same direction to allow the housing 1202 to approach the workpiece by a very small distance, thereby permitting the focused light by the second sighting lens to be sensed only by the photo sensing element 1215-3.

In this way, in both cases (a) and (b) as well, the housing 1202 is moved by a very small distance until the focused light by the second sighting lens is sensed only by the photo sensing element 1215-3, and the motor 1203 is stopped when it is sensed only by the photo sensing element 1215-3.

When the convergent point of the sighting light coincides with the working surface of the workpiece 1217, the control unit 1216 generates a command to radiate the working laser beam onto the workpiece.

At this time, radiation of the laser beam is controlled by increasing the discharge electric power the power supply unit in the case where the laser generator 1204 is a gas laser; by increasing a power of a light emitting apparatus for pumping in case of a solid-state laser; or by opening and closing a shutter (not shown) which is provided on the output side of the laser generator 1204.

When the laser beam is generated from the laser generator 1204, it is reflected by the selective transmitting mirror 1205 and is focused by the focusing lens 1207, thereafter it is radiated onto the working point of the workpiece 1217, so that working such as boring, cutting, welding, etc. is started.

As a consequence, in the embodiment shown in FIG. 12, the focal point of the lens system to focus the laser beam is automatically adjusted, thereby saving labor and enabling the working accuracy to be extremely improved.

A part of the laser beam generated from the working laser generator can be also utilized as a light source for sighting. In such a case, the selective transmitting mirror 1205 for reflecting the laser beam from the laser generator, can be constructed as a half mirror which reflects almost of the laser beam and transmits the other part thereof and a part of the laser beam reflected by the working surface of the workpiece is allowed to be transmitted through this half mirror and this transmitted light is sensed by the photoelectric converter, and at the same time an aperture is provided on the output side of the laser generator and an apparatus for automatically controlling the focal point location is made operative by narrowing this aperture, thereafter the aperture is released and the working is performed.

As in the embodiment shown in FIG. 11, the infrared reflecting mirror 1109 is arranged in the light path of the working laser beam. Or, as in the embodiment shown in FIG. 12, the selective transmitting mirror 1205 is used as a reflecting mirror to reflect the working laser beam to the working portion and the sighting light is introduced to the working portion through that mirror or is taken out from the working portion. These operations can be performed only when the auxiliary energy is radiated to a location which is slightly spaced apart from the working laser beam in accordance with the fundamental principle of the present invention. Namely, as in a conventional publicly known laser machining apparatus, in a system which works by focusing the working laser beam and auxiliary energy to the same point, the light paths of the laser beam and auxiliary energy complicatedly overlap, so that there is no room where such an optical system for automatic adjustment of the focal point as mentioned above is interposed.

As described above, in the laser machining apparatus according to the present invention, a plasma jet or other auxiliary energy is radiated to a location on a workpiece which is slightly spaced apart from the irradiation point of the working laser beam. Thus, working efficiency and working accuracy are improved and the structure of the whole system is simplified, resulting in less failure. In addition, it is also possible to equip various additional apparatuses to further improve working efficiency. Furthermore, a focal point automatic adjusting mechanism of the laser beam can be also provided.

The arrangement of the present invention is not limited to the above-mentioned embodiments, but the invention incorporates all of the various changes and modifications which can be easily made by a person skilled in the art on the basis of the embodiments described in the specification and shown in the accompanying drawings.

INDUSTRIAL APPLICABILITY

The present invention further improves working efficiency and working accuracy of laser machining apparatuses which are at present widely used to work metal, glass, ceramics, plastic, or other special materials. Also, the invention is extremely useful to make the operations for working easy and to simplify the structure of the system itself and to reduce the cost.

What is claimed is:

1. A laser machining apparatus for performing a machining operation of a workpiece, said apparatus comprising means supporting a workpiece, a working laser generator for focusing a laser beam on the workpiece to effect a machining operation thereon, an auxiliary energy generator for supplying auxiliary energy onto said workpiece of a magnitude to heat said workpiece without effecting machining thereof, means for radiating said auxiliary energy onto said workpiece at a location spaced from the focussed laser beam for preheating the workpiece in preparation for irradiation thereon of the focused laser beam whereby to minimize the magnitude of laser energy required for machining while also minimizing thermal distortion of the workpiece, support means supporting the laser generator and the auxiliary energy generator, means for providing relative movement between said support means and the means supporting the workpiece such that the laser beam machines the workpiece in a working progressing direction along a determined path and means for adjusting the position of the auxiliary energy generator relative to the laser generator in correspondence with the relative movement of said support means and the workpiece so that said location at which said auxiliary energy is radiated precedes the irradiation point of said laser beam in the working progressing direction during machining of said workpiece along said predetermined path.

2. A laser machining apparatus as claimed in claim 1, wherein said auxiliary energy is radiated to the surface of the workpiece opposite to the surface of the workpiece onto which said laser beam is radiated.

3. A laser machining apparatus as claimed in claim 1, wherein said auxiliary energy is radiated to a region surrounding the irradiation point of said laser beam.

4. A laser machining apparatus as claimed in claim 1 wherein said means for adjusting the position of the auxiliary energy generator relative to the laser generator comprises a rotatable attachment for said auxiliary energy generator around an optical axis of said laser beam as a center.

5. A laser machining apparatus as claimed in claim 1, wherein said auxiliary energy generator comprises a plasma generating apparatus.

6. A laser machining apparatus as claimed in claim 1, wherein said auxiliary energy generator comprises a laser generator.

7. A laser machining apparatus as claimed in claim 1, wherein said auxiliary energy generator comprises a glow or corona discharge generating apparatus.

8. A laser machining apparatus as claimed in claim 1, wherein said auxiliary energy generator comprises an arc discharge generating apparatus.

9. A laser machining apparatus as claimed in claim 1, wherein said auxiliary energy generator comprises a Xenon light radiating apparatus.

10. A laser machining apparatus as claimed in claim 6, wherein a gas discharged from said laser generator is introduced to said plasma generating apparatus and is used as a part of plasma gas.

11. A laser machining apparatus as claimed in claim 1, comprising means for supplying an abrasive grain to a working portion of said workpiece.

12. A laser machining apparatus as claimed in claim 1, comprising means for discharging a high-pressure working fluid to a working portion of said workpiece.

13. A laser machining apparatus as claimed in claim 1, wherein a working fluid is supplied to a working portion of the workpiece and the working is performed while evaporating 80% or more of said working fluid by said laser beam and said auxiliary energy.

14. A laser machining apparatus as claimed in claim 1, comprising a working fluid supplying apparatus for supplying a working fluid to which an ultrasonic vibrational energy is applied to a working portion of the workpiece or a portion immediately after that at which working is carried out.

15. A laser machining apparatus as claimed in claim 1, comprising a sealed casing which can enclose the workpiece and a gas consisting of a halogen or halogen compound is introduced in the casing, and the working is carried out in said gas atmosphere.

16. A laser machining apparatus as claimed in claim 1, comprising a sensor to sense infrared rays generated from a working portion of the workpiece and a control unit to adjust a location of a focal point of the laser beam in response to a signal from said sensor such that the maximum amount of infrared energy is always sensed from the working portion.

17. A laser machining apparatus as claimed in claim 1, wherein a parallel sighting light which is focused together with the laser beam at a working portion is introduced into a light path of the laser beam through a selective transmitting mirror, and said sighting light reflected by the working portion is taken out through said selective transmitting mirror and is focused on a photoelectric converter, and a control unit to adjust the location of a focal point of said laser beam by interpreting and operating an output signal from said photoelectric converter.

18. A laser machining apparatus as claimed in claim 1 comprising support means supporting the laser generator and the auxiliary energy generator and means for providing relative movement between said support means and the means supporting the workpiece such that the laser beam machines the workpiece in a working progressing direction along a determined path.

19. A laser machining apparatus as claimed in claim 18, wherein said location at which said auxiliary energy is radiated precedes the irradiation point of said laser beam in the working progressing direction.

* * * * *